US012649599B2

(12) United States Patent
Pontini et al.

(10) Patent No.: US 12,649,599 B2
(45) Date of Patent: Jun. 9, 2026

(54) CABLE TIE TENSIONING AND CUT-OFF TOOL

(71) Applicant: Illinois Tool Works Inc., Glenview, IL (US)

(72) Inventors: Mattia Pontini, Padua (IT); Lorenzo Altarino, Padua (IT); Michele Lucon, Padua (IT)

(73) Assignee: Illinois Tool Works Inc., Glenview, IL (US)

( * ) Notice: Subject to any disclaimer, the term of this patent is extended or adjusted under 35 U.S.C. 154(b) by 266 days.

(21) Appl. No.: 18/560,191

(22) PCT Filed: May 23, 2022

(86) PCT No.: PCT/US2022/030530
§ 371 (c)(1),
(2) Date: Nov. 10, 2023

(87) PCT Pub. No.: WO2022/251113
PCT Pub. Date: Dec. 1, 2022

(65) Prior Publication Data

US 2024/0228089 A1 Jul. 11, 2024

(30) Foreign Application Priority Data

May 24, 2021 (EP) .................................... 21175559
Nov. 29, 2021 (EP) .................................... 21211181

(51) Int. Cl.
*B65B 13/22* (2006.01)
*B25B 25/00* (2006.01)
*B65B 13/02* (2006.01)

(52) U.S. Cl.
CPC ............. *B65B 13/22* (2013.01); *B25B 25/00* (2013.01); *B65B 13/027* (2013.01)

(58) Field of Classification Search
CPC ..... B65B 13/027; B65B 13/025; B65B 13/22; B65B 13/08; B65B 13/02; B25B 25/00
See application file for complete search history.

(56) References Cited

U.S. PATENT DOCUMENTS 3,433,275 A 3/1969 Eppler
3,830,263 A * 8/1974 Benfer .................... B65B 13/24 140/93.2

(Continued)

FOREIGN PATENT DOCUMENTS

CN 110406720 A 11/2019
DE 29722524 U1 2/1998

(Continued)

OTHER PUBLICATIONS

Translation of KR-20010070177.*

(Continued)

*Primary Examiner* — Bobby Yeonjin Kim
(74) *Attorney, Agent, or Firm* — Neal, Gerber & Eisenberg LLP

(57) ABSTRACT

The present invention provides for an improved tool for tensioning and severing an elongate cable tie having a tie head portion and a tie tail portion, said tool comprising: a pistol-shaped housing having a barrel portion extending between a distal housing end portion and a proximal housing end portion along a longitudinal axis and a handle portion extending away from said barrel portion in a direction different to said longitudinal axis; a trigger mechanism comprising an elongate trigger member extending away from said barrel portion operably forward of said handle portion and configured to pivotably move toward and away from said handle portion; a tension mechanism comprising a pawl link provided slidably reciprocatingly within said barrel portion along said longitudinal axis and operably coupled to said trigger mechanism, configured to grippingly (Continued)

engage the cable tie and apply tension to the tie tail when moving said elongate trigger member toward said handle portion, during use; a locking mechanism within said barrel portion and operably coupled with said tension mechanism, configured to stop operation of and lock said tension mechanism at a predetermined tension of the tie tail; a cut-off mechanism within said barrel portion and operably coupled with said trigger mechanism and said locking mechanism configured to cut the tie tail when said locking mechanism is lockingly actuated, and an adjustable biasing mechanism comprising a second biasing member provided within said barrel portion, adapted to provide a biasing load to any one of said trigger mechanism, said tension mechanism and said cut-off mechanism.

11 Claims, 23 Drawing Sheets

(56) References Cited

U.S. PATENT DOCUMENTS

| | | | | | |
|---|---|---|---|---|---|
| 3,976,108 | A | | 8/1976 | Caveney et al. | |
| 4,081,002 | A | * | 3/1978 | Violi | B65B 13/027 140/93.2 |
| 4,335,477 | A | | 6/1982 | Halstead | |
| 4,495,972 | A | | 1/1985 | Walker | |
| 4,498,507 | A | | 2/1985 | Thompson | |
| 4,548,242 | A | * | 10/1985 | Paradis | F16L 3/12 140/93.2 |
| 4,610,067 | A | | 9/1986 | Hara | |
| 4,793,385 | A | * | 12/1988 | Dyer | B65B 13/027 140/93.2 |
| 4,862,928 | A | | 9/1989 | Caveney et al. | |
| 5,205,328 | A | | 4/1993 | Johnson et al. | |
| 5,492,156 | A | * | 2/1996 | Dyer | B65B 13/027 140/93.2 |
| 5,595,220 | A | | 1/1997 | Leban et al. | |
| 5,769,133 | A | * | 6/1998 | Dyer | B65B 13/027 140/93.2 |
| 5,921,290 | A | | 7/1999 | Dyer et al. | |
| 5,944,064 | A | | 8/1999 | Saito et al. | |
| 5,947,166 | A | | 9/1999 | Doyle et al. | |
| D430,781 | S | | 9/2000 | Hillegonds | |
| 6,119,734 | A | | 9/2000 | Kurmis | |
| 6,206,053 | B1 | | 3/2001 | Hillegonds | |
| 6,497,258 | B1 | | 12/2002 | Flannery et al. | |
| 6,513,555 | B1 | | 2/2003 | Lesser et al. | |
| D473,773 | S | | 4/2003 | Hillegonds et al. | |
| 6,615,879 | B2 | | 9/2003 | Kurmis | |
| D491,430 | S | | 6/2004 | Magno et al. | |
| 6,840,289 | B2 | | 1/2005 | Hillegonds | |
| 7,086,426 | B2 | | 8/2006 | Magno et al. | |
| 7,210,506 | B2 | | 5/2007 | Magno, Jr. | |
| 7,216,679 | B2 | | 5/2007 | Magno et al. | |
| D543,811 | S | | 6/2007 | Lueschen | |
| 7,231,944 | B2 | | 6/2007 | Magno et al. | |
| D547,626 | S | | 7/2007 | Lueschen | |
| 7,299,830 | B2 | * | 11/2007 | Levin | B65B 13/027 140/93.2 |
| D692,738 | S | | 11/2013 | Dyer | |
| 8,955,556 | B2 | | 2/2015 | Myers et al. | |
| 8,960,241 | B2 | | 2/2015 | Dyer | |
| D758,155 | S | | 6/2016 | Kruzel | |
| 9,394,067 | B2 | | 7/2016 | Dyer | |
| 9,394,068 | B2 | | 7/2016 | Dyer | |
| 9,550,590 | B2 | | 1/2017 | Dyer | |
| 9,694,924 | B2 | | 7/2017 | Myers et al. | |
| D818,787 | S | | 5/2018 | Kitago | |
| D885,861 | S | | 6/2020 | Ni | |
| 11,827,394 | B2 | | 11/2023 | Hempe et al. | |
| 2004/0079436 | A1 | | 4/2004 | Hillegonds | |
| 2005/0178460 | A1 | | 8/2005 | Magno | |
| 2005/0178461 | A1 | | 8/2005 | Magno et al. | |
| 2013/0167970 | A1 | | 7/2013 | Dyer | |
| 2015/0053301 | A1 | * | 2/2015 | Dyer | B65B 13/027 140/123.6 |
| 2016/0167813 | A1 | | 6/2016 | Myers | |
| 2017/0057674 | A1 | | 3/2017 | Myers | |
| 2019/0127095 | A1 | | 5/2019 | Kitago | |
| 2019/0193879 | A1 | | 6/2019 | Yamamoto et al. | |
| 2020/0180799 | A1 | | 6/2020 | Ni | |

FOREIGN PATENT DOCUMENTS

| | | | | | |
|---|---|---|---|---|---|
| DE | 102020117522 | A1 | | 1/2021 | |
| EP | 1108649 | A2 | | 6/2001 | |
| GB | 1094469 | A | | 12/1967 | |
| GB | 1589086 | A | * | 5/1981 | B65B 13/027 |
| JP | S5974017 | A | | 4/1984 | |
| JP | 2007117055 | A | | 5/2007 | |
| JP | 6010119 | B2 | | 9/2016 | |
| JP | 6174495 | B2 | | 7/2017 | |
| JP | 6288801 | B2 | | 2/2018 | |
| KR | 20010070177 | A | * | 7/2001 | B65B 13/027 |
| WO | 2013003471 | A1 | | 1/2013 | |

OTHER PUBLICATIONS

International Search Report and Written Opinion from International Application No. PCT/US2022/030530, mailed Nov. 2, 2022 (23 pages).

* cited by examiner (a)

(b)

*(a)*

*(b)*

(a)

(b)

*(a)*

*(b)*

(a)

(b)

*(a)*

*(b)*

*(a)*

*(b)*

*(a)*

*(b)*

(a)

(b)

(c)

(a)

(b)

*(a)*

*(b)*

(a)

(b)

CABLE TIE TENSIONING AND CUT-OFF TOOL

PRIORITY CLAIM

This application is a national stage application of PCT/US2022/030530, filed on May 23, 2022, which claims priority to and the benefit of European Patent Application No. 21175559.0, which was filed on May 24, 2021 and European Patent Application No. 21211181.9, which was filed on Nov. 29, 2021, the entire contents of each of which are incorporated herein by reference.

TECHNICAL FIELD

The present disclosure relates to hand-held tensioning and cutting tools and in particular, to an improved hand tool for tensioning and cutting cable ties.

BACKGROUND

Cable ties, also known as zip ties or hose ties, are widely used in a variety of environments and applications. For example, cable ties may be used to securely bundle a plurality of wires, cables or conduits such as those found in the automotive industry. Also, cable ties may be used to secure articles to rigid structures (e.g. a chassis), but may also be utilised as hose clamps. Typically, a cable tie comprises a tie head portion and a tie tail portion of various lengths that is integrally formed with the head portion. During use, the tie tail is threaded through the tie head so as to encircle the articles to be bound or secured. The tie tail section is usually provided with teeth that engage with a pawl provided in the tie head and forming a ratchet so that, as the free end of the tie tail is pulled, the cable tie tightens and does not come undone. Once the tie tail of the cable tie has been pulled through the tie head and past the ratchet, it is prevented from being pulled back, thus, the resulting loop may only be pulled tighter. Some cable ties may include a tab that can be depressed to release the ratchet so that the cable tie can be loosened or be removed and possibly reused.

A cable tie tensioning device, also known as cable tie tool or cable tie gun, may be used to install cable ties and apply a predefined degree of tension, as well as, cut off the extra tail. Preferably, the cut tie tail is flush with the tie head portion so as to avoid sharp edges, which might otherwise cause injuries. Light-duty tools may be operated by simply and repeatedly squeezing the handle and trigger with the fingers until a desired tension of the cable tie has been reached to then cut off the tail section of the tightened cable tie. Heavy-duty or automated tools may be powered, for example, by compressed air or a solenoid (i.e. actuator) to assist the user when operating the tool.

Available tools can be rather inaccurate in the desired tension applied to the cable tie, as well as, in leaving protruding remnants of the cut tie tail portion. As a result, higher-quality tools have become rather complex (and expensive) in order to achieve a desired tensioning at sufficient accuracy, as well as, a consistently clean and flush cut-off section.

As mentioned before, the accuracy of the selected cable tension and the reliability of the cut-off threshold can be a crucial factor when using cable ties to fasten or fix specific components. On the other hand, the cost of manufacture, wear resistance and durability, as well as, its ease of use and user handling are equally as important.

Accordingly, it is an object of the present disclosure to provide an improved, as well as simplified cable tie tool for tensioning and cutting cable ties, thus, reducing manufacturing costs while improving durability and ease of use.

SUMMARY

Aspects of the present disclosure is set out in the independent claims. Dependent claims describe optional features.

According to a first aspect of the present disclosure, there is provided a tool for tensioning and severing an elongate cable tie having a tie head portion and a tie tail portion, said tool comprising:

- a pistol-shaped housing, having a barrel portion extending between a distal housing end portion and a proximal housing end portion along a longitudinal axis, and a handle portion extending away from said barrel portion in a direction different to said longitudinal axis;
- a trigger mechanism, comprising an elongate trigger member extending away from said barrel portion operably forward of said handle portion and configured to move toward and away from said handle portion;
- a tension mechanism, comprising a pawl link provided slidably reciprocatingly within said barrel portion along said longitudinal axis and operably coupled to said trigger mechanism, configured to grippingly engage the cable tie and apply tension to the tie tail when moving said elongate trigger member toward said handle portion, during use; a locking mechanism, provided within said barrel portion and operably coupled with said tension mechanism, configured to stop operation of and lock said tension mechanism at a predetermined tension of the tie tail;
- a cut-off mechanism, provided within said barrel portion and operably coupled with said trigger mechanism and said locking mechanism, configured to cut the tie tail when said locking mechanism is lockingly actuated, and
- wherein said pawl link comprises at least one guide aperture at a distal end portion configured to slidably receive and retain a corresponding guide member of a gripping pawl, so as to allow sliding movement of said gripping pawl relative to said pawl link between a first position and a second position, towards the cable tie tail, during use, in a direction intersecting said longitudinal axis, and wherein said gripping pawl is resiliently biased towards said second position.

This provides the advantage that the guide aperture can be defined so as to optimise the path of the gripping pawl relative to the pawl link, thus, allowing a maximised contact engagement between the gripping pawl and the cable tie tail, during use. In addition, using a biased sliding movement of the gripping pawl allows for a greater range of tie tail thicknesses that can be accommodated (i.e. sufficiently gripped) with the tool.

Preferably, said second position is distal to said first position.

Advantageously, said pawl link comprises two substantially matching parallelly arranged arms extending along said longitudinal axis, each one provided with a respective one of said at least one guide aperture at said distal end portion, configured to operably receive and slidingly retain said gripping pawl, therebetween. Preferably, two guide apertures may be provided at said distal end portion of each one of said two substantially matching parallelly arranged arms.

Advantageously, said pawl link further comprises a backing plate at said distal end portion configured to cooperate with said gripping pawl so as to operably engage the cable tie, during use. Preferably, said backing plate is provided on an upper surface of said pawl link facing in a direction opposite said handle portion.

Advantageously, said second position is towards said backing plate.

Advantageously, said at least one guide aperture defines a predetermined cam profile for said guide member configured to maximise contact engagement between said gripping pawl, the tie tail and said backing plate, during use.

Advantageously, said gripping pawl is resiliently biased towards said second position via a spring element operably coupled between said gripping pawl and said pawl link.

Advantageously, said at least one guide member extends from a side portion of said gripping pawl in a direction perpendicular to said longitudinal axis.

Advantageously, said gripping pawl is further adapted to contactingly engage with an engagement portion of said distal housing end portion so as to push said gripping pawl towards said first position by a predetermined distance when said pawl link is in a starting position.

According to a second aspect of the present disclosure, there is provided a tool for tensioning and severing an elongate cable tie having a tie head portion and a tie tail portion, said tool comprising:

a pistol-shaped housing, having a barrel portion extending between a distal housing end portion and a proximal housing end portion along a longitudinal axis and a handle portion extending away from said barrel portion in a direction different to said longitudinal axis;

a trigger mechanism, comprising an elongate trigger member extending away from said barrel portion operably forward of said handle portion and configured to move toward and away from said handle portion;

a tension mechanism, comprising a pawl link provided slidably reciprocatingly within said barrel portion along said longitudinal axis and operably coupled to said trigger mechanism, configured to grippingly engage the cable tie and apply tension to the tie tail when moving said elongate trigger member toward said handle portion, during use; a locking mechanism, provided within said barrel portion and operably coupled with said tension mechanism, configured to stop operation of and lock said tension mechanism at a predetermined tension of the tie tail, during use;

a cut-off mechanism, provided within said barrel portion and operably coupled with said trigger mechanism and said locking mechanism, configured to cut the tie tail when said locking mechanism is lockingly actuated, and wherein said locking mechanism further comprises:

a locking lever, having a stop member at a proximal lever end and a contact portion at a distal lever end, said locking lever is arranged parallelly adjacent to said pawl link and pivotally coupled to a first fulcrum pin of said pawl link, so as to allow rotation of said locking lever about said fulcrum pin relative to said pawl link between an unlocked position and a locked position;

a rack member, mounted immovably relative to said housing, adapted to lockingly engage with said stop member when said locking lever is in said locked position; wherein said contact portion is arranged so as to operably engage with said cut-off mechanism so as to be moved between an upper position, retaining said locking lever in said unlocked position, and a lower position, moving said locking lever into said locked position.

This provides the advantage of obtaining a more stable and repetitive tension in the cable tie tail, allowing for cleaner and closer tail cuts, i.e. minimising or even avoiding any protruding edges from the tie head portion.

Advantageously, said contact portion of said locking lever is arranged so as to contactingly engage with a cutting lever of said cut-off mechanism.

Preferably, said locking lever is biased towards said locked position.

Advantageously, said locking mechanism further comprises a lever support member mounted to said proximal end portion of said pawl link and configured to supportingly engage with said proximal lever end when in said unlocked position.

Advantageously, said lever support member comprises a first biasing member configured to resiliently bias said locking lever towards said locked position. Preferably, said first biasing member is a coil spring integrated with a support surface of said lever support member.

Advantageously, said stop member comprises at least one tooth-shaped protrusion extending from said proximal lever end towards said rack member. Preferably, said stop member comprises a plurality of tooth-shaped protrusions.

Advantageously, said rack member comprises a plurality of equidistantly spaced recesses on a bottom surface, each one configured to interlockingly receive said stop member.

According to a third aspect of the present disclosure, there is provided a tool for tensioning and severing an elongate cable tie having a tie head portion and a tie tail portion, said tool comprising:

a pistol-shaped housing, having a barrel portion extending between a distal housing end portion and a proximal housing end portion along a longitudinal axis and a handle portion extending away from said barrel portion in a direction different to said longitudinal axis;

a trigger mechanism, comprising an elongate trigger member extending away from said barrel portion operably forward of said handle portion and configured to move toward and away from said handle portion;

a tension mechanism, comprising a pawl link provided slidably reciprocatingly within said barrel portion along said longitudinal axis and operably coupled to said trigger mechanism, configured to grippingly engage the cable tie and apply tension to the tie tail when moving said elongate trigger member toward said handle portion, during use;

a locking mechanism, provided within said barrel portion and operably coupled with said tension mechanism, configured to stop operation of and lock said tension mechanism at a predetermined tension of the tie tail;

a cut-off mechanism, provided within said barrel portion and operably coupled with said trigger mechanism and said locking mechanism, configured to cut the tie tail when said locking mechanism is lockingly actuated, said cut-off mechanism comprising:

a cutting lever, having a blade member at a distal cutting lever end, arranged parallelly below said pawl link and pivotally coupled at a second fulcrum pin of said housing, so as to allow rotation of said cutting lever about said second fulcrum pin relative to said housing between an upper position, cuttingly engaging with the cable tie, and a lower position, disengaged from the cable tie;

cutting linkage, operably coupling a proximal cutting lever end with said trigger mechanism, so as to rotate said cutting lever between said upper position and said lower position at a predetermined condition during actuation of said trigger mechanism.

The use of a cutting linkage directly coupling the cutting lever with the trigger mechanism provides for a simplified and more hardwearing (i.e. more reliable) assembly with a reduced number of parts compared to tools with similar capability, that are known to generally have a relatively complicated mechanism utilising, for example, a cooperating cut-off cam and dog bone cam shaft operably coupled with a rack and biased pinion. Thus, the present disclosure provides for reduced overall manufacturing costs and improved durability.

Advantageously, said proximal cutting lever end comprises a protrusion extending towards said locking mechanism.

Advantageously, said cutting linkage comprises a pivot link and a sliding link operably coupled so as to translate a force generated through an inner trigger link of said trigger mechanism from a direction towards said distal housing end portion along said longitudinal axis into a rotational movement of said cutting lever about said second fulcrum pin.

Advantageously, said sliding link is operably coupled within said housing so as to allow sliding movement in a direction parallel to said longitudinal axis.

Advantageously, said pivot link is biased so as to move said cutting lever towards said lower position.

Advantageously, said predetermined condition is a predetermined tension of the tie tail transmitted via said inner trigger link, during use.

Advantageously, said tool further comprises an adjustable biasing mechanism operably coupled to said inner trigger link via said cutting linkage, configured to provide an adjustable threshold force defining said predetermined tension of the tie tail during use.

According to a fourth aspect of the present disclosure, there is provided a tool for tensioning and severing an elongate cable tie having a tie head portion and a tie tail portion, said tool comprising:

a pistol-shaped housing, having a barrel portion extending between a distal housing end portion and a proximal housing end portion along a longitudinal axis and a handle portion extending away from said barrel portion in a direction different to said longitudinal axis;

a trigger mechanism, comprising an elongate trigger member extending away from said barrel portion operably forward of said handle portion and configured to move toward and away from said handle portion;

a tension mechanism, comprising a pawl link provided slidably reciprocatingly within said barrel portion along said longitudinal axis and operably coupled to said trigger mechanism, configured to grippingly engage the cable tie and apply tension to the tie tail when moving said elongate trigger member toward said handle portion, during use;

a locking mechanism, provided within said barrel portion and operably coupled with said tension mechanism, configured to stop operation of and lock said tension mechanism at a predetermined tension of the tie tail;

a cut-off mechanism, provided within said barrel portion and operably coupled with said trigger mechanism and said locking mechanism, configured to cut the tie tail when said locking mechanism lockingly actuated, and an adjustable biasing mechanism, comprising a second biasing member provided within said barrel portion, adapted to provide a biasing load to any one of said trigger mechanism, said tension mechanism and said cut-off mechanism.

Advantageously, said biasing mechanism comprises a lever link configured to operably couple said second biasing member with any one of said trigger mechanism, said tension mechanism and said cut-off mechanism.

Advantageously, said lever link is pivotably mounted to a third fulcrum pin of said housing, so as to translate a linear movement from a sliding link of a cutting linkage of said cut-off mechanism into a rotational movement of said lever link about said third fulcrum pin.

Advantageously, said second biasing member is operably coupled with said lever link so as to biasingly counteract rotational movement of said lever link about said third fulcrum pin.

Advantageously, said tool further comprises a preload control mechanism configured to selectively change said biasing load provided by said second biasing member in predetermined steps.

Advantageously, said preload control mechanism comprises a lead screw mechanism operably coupled between an adjustment knob and said second biasing member and adapted to convert a rotational movement of said adjustment knob into a change of said biasing load provided by said second biasing member.

This provides the advantage of allowing adjustment of the maximum tension applied to the tie tail at which the cutting mechanism is actuated, and the tie tail is cut. Thus, the user has the option to apply different cable tie pressures to the bundled components.

Additionally, said preload control mechanism may comprise a gear mechanism operably coupled between said adjustment knob and said lead screw mechanism, configured to provide a predetermined transmission ratio between rotational movement of said adjustment knob and a resulting rotational movement of a threaded shaft of said lead screw mechanism.

Preferably, said a gear mechanism is a spin multiplier.

BRIEF DESCRIPTION OF THE DRAWINGS

An exemplary embodiment of the present disclosure is explained in more detail hereinbelow with reference to the figures.

DETAILED DESCRIPTION

Figure 1:
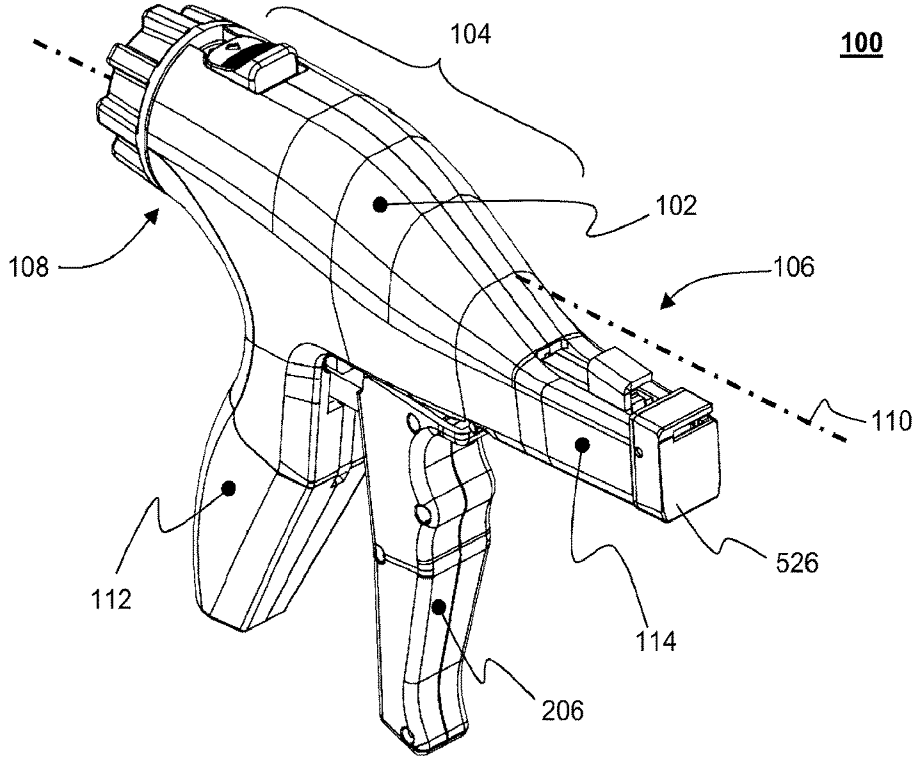
FIG. 1 illustrates perspective (a) front view and (b) rear view of the preferred embodiment of the cable tie tool of the present disclosure.
Figure 1:
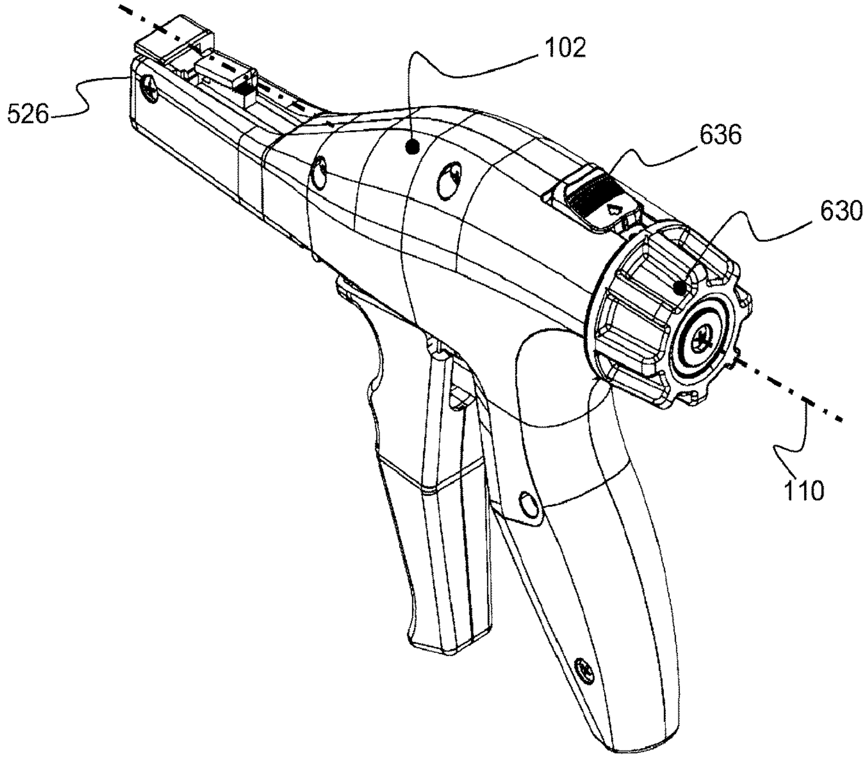

The described example embodiment relates to a hand-held tensioning and cutting tool such as a cable tie tool for use with cable ties. However, the present disclosure is not limited to hand-held devices and may be used for any tool suitable for tensioning and cutting cable ties.

Certain terminology is used in the following description for convenience only and is not limiting. The words 'right', 'left', 'lower', 'upper', 'front', 'rear', 'upward', 'down', 'downward', 'above' and 'below' designate directions in the drawings to which reference is made and are with respect to the described component when assembled and mounted (e.g. in situ). In particular, the designated directions used in the description are with respect to the hand held tool held by the user in a normal, upright position, i.e. the handle portion pointing downwards and the barrel portion pointing forward and away from the user. It is understood that the tool may be used in any other orientation suitable for the job at hand, though, for simplicity, the designated directions are used when the tool is in a "normal" orientation. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Through the description and claims of this specification, the terms 'comprise' and 'contain', and variations thereof, are interpreted to mean 'including but not limited to', and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality, as well as, singularity, unless the context requires otherwise.

Features, integers, characteristics, compounds, chemical moieties or groups described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The present disclosure is not restricted to the details of any foregoing embodiments. The present disclosure extends to any novel one, or any novel combination, of the features disclosed in this specification (including any accompanying claims, abstract or drawings), or to any novel one, or any novel combination, of the steps of any method or process so disclosed.

Referring now to FIGS. 1 to 4, an example embodiment of the cable tie tool 100 incorporating the principles of the present disclosure is preferably pistol shaped and intended to be hand-held by the user. The cable tie tool 100 comprises a housing 102 having a barrel portion 104 extending along a longitudinal axis 110 between a distal housing end portion 106 and a proximal housing end portion 108. A handle portion 112 extends away from the proximal housing end portion 108 in a direction intersecting with the longitudinal axis 110, for example, at an angle between 60° and 90° with respect to the longitudinal axis 110. The housing 102 may further comprise a trigger housing portion 206, a front cover portion 114 (or nose piece) provided at the distal housing end portion 106. The front cover portion 114 may be an integral part of the housing 102. An adjustment knob 630 and a biased locking switch 636 is provided at the proximal housing end portion 108.

Figure 2:
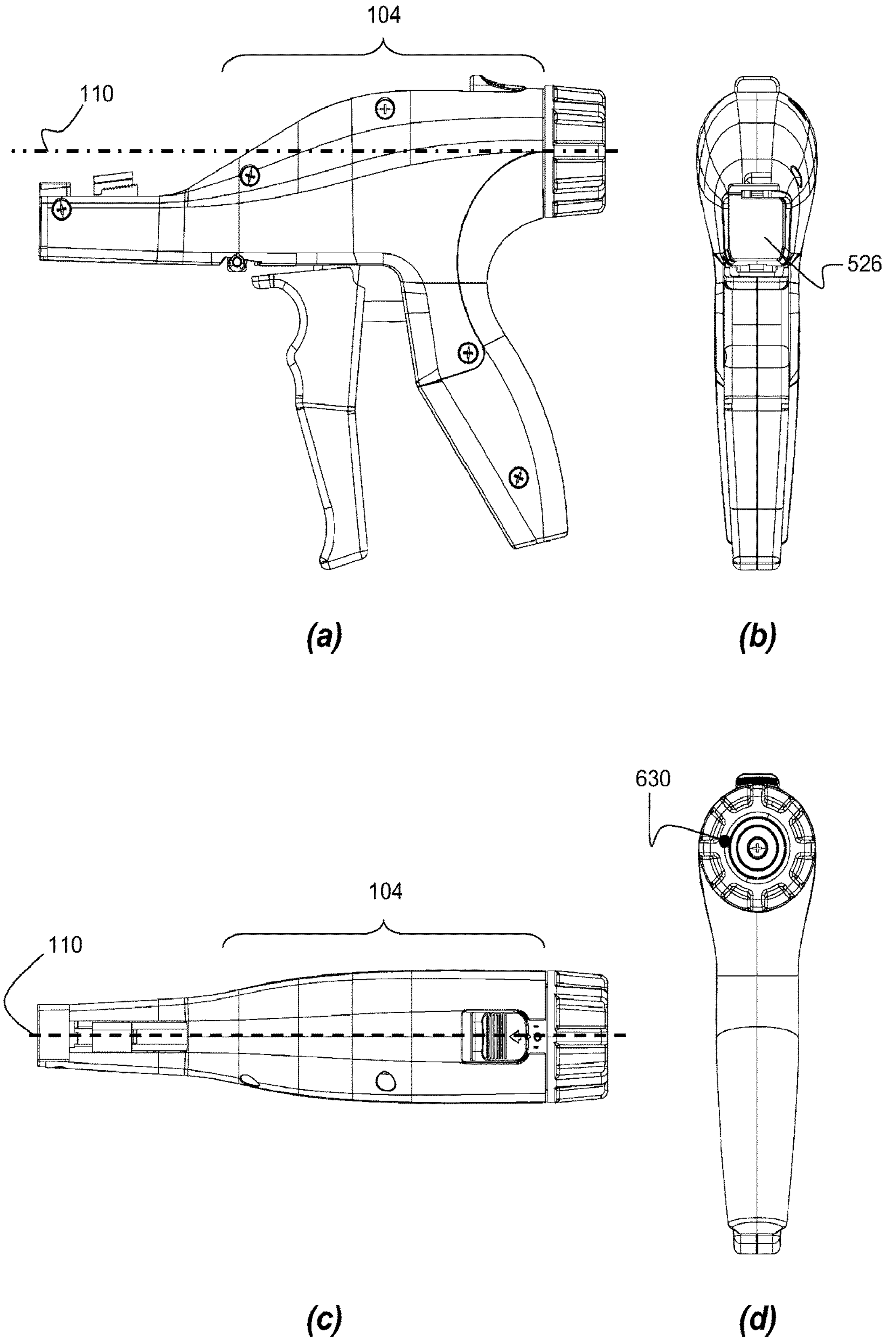
FIG. 2 illustrates a (a) side view, (b) front view, (c) top view and (d) rear view of the preferred embodiment of the cable tie tool of the present disclosure.

FIGS. 2 (*a*) to (*d*) shows the cable tie tool 100 in respective side-view, front-view (distal end), top-view and rear-view (proximal end).

Figure 3:
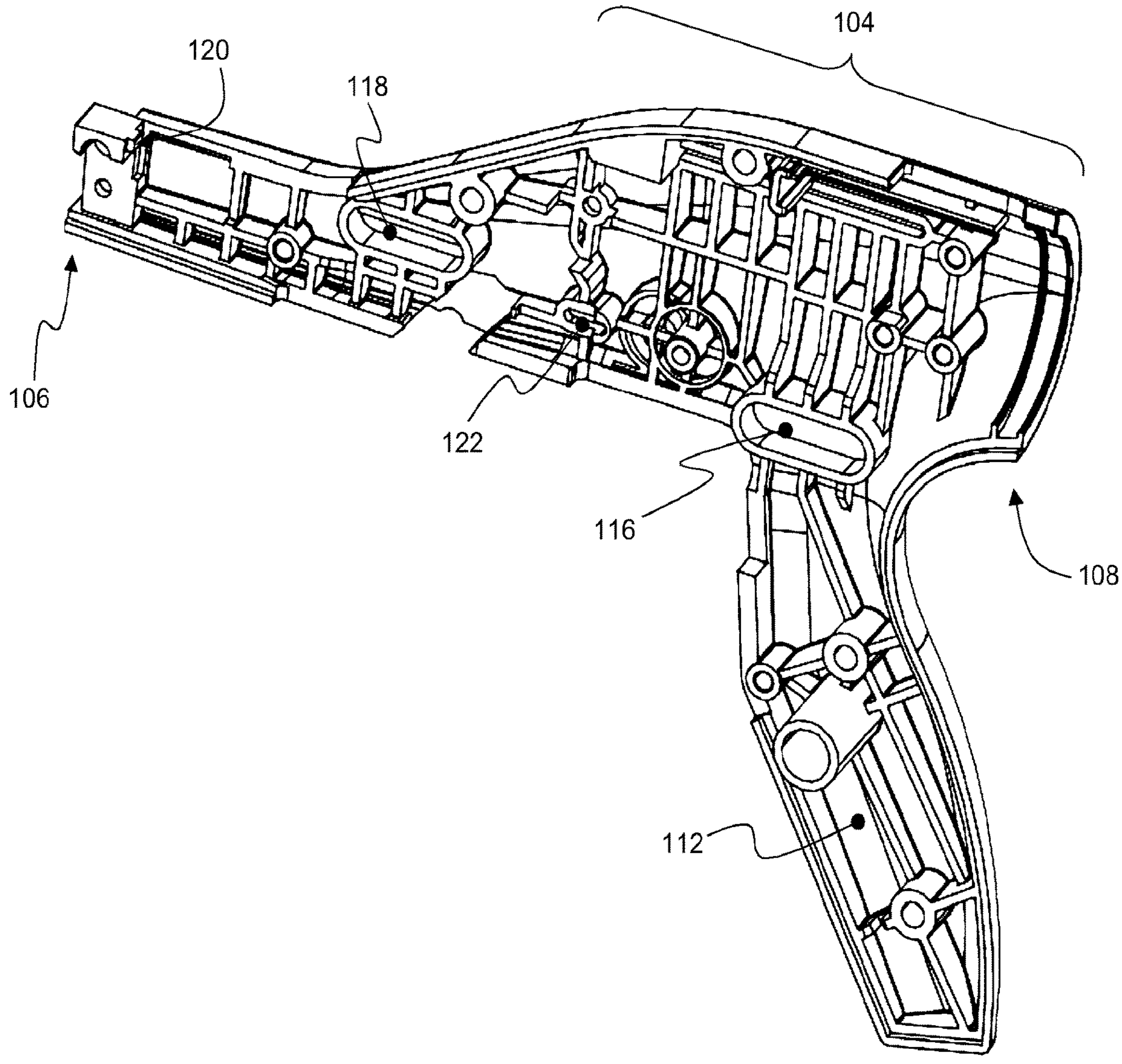
FIG. 3 illustrates a cross-sectional perspective rear side view of the preferred embodiment of the housing, without the tool mechanism as shown in FIG. 5.

FIG. 3 shows an illustration of the preferred embodiment of the housing 102 in a cross-sectional perspective side rear view providing further details of the interior wall structure of the housing 102. In particular, the interior of the housing 102 provides various engagement portions (e.g. blocks), cam guides, slots or blocks for various parts of the tool mechanism(s), as well as, receptacles for fasteners.

The cable tie tool 100 mechanism is operably embedded into the housing 102 and, for a better understanding, has been divided into separate functional groups that are operably coupled to each other so as to provide the desired functions of the tool 100. The mechanism of the cable tie tool 100 can be grouped into the trigger mechanism 200, mostly embedded within the handle portion 112 and trigger housing portion 206 and is adapted to be moved by the user's hand during operation, the tension mechanism 300, embedded within the barrel portion 104 and adapted to grippingly engage the cable tie tail and apply a predetermined maximum tension, the locking mechanism 400, embedded within the barrel portion 104 and adapted to lock the trigger mechanism 200 and tensioning mechanism 300 at the predetermined (i.e. selected) maximum tension applied to the cable tie tail, the cut-off mechanism 500, partly embedded within the barrel portion 104 and at the distal housing end portion 106 of the tool 100 and configured to cut through the cable tie tail when the predetermined tension applied to the cable tie tail is reached, and the adjustable biasing mechanism 600, partly embedded within the proximal housing end portion 108 of the barrel portion 104 and adapted to adjust the biasing force defining the maximum tension applied to the cable tie tail, during use.

Figure 4:
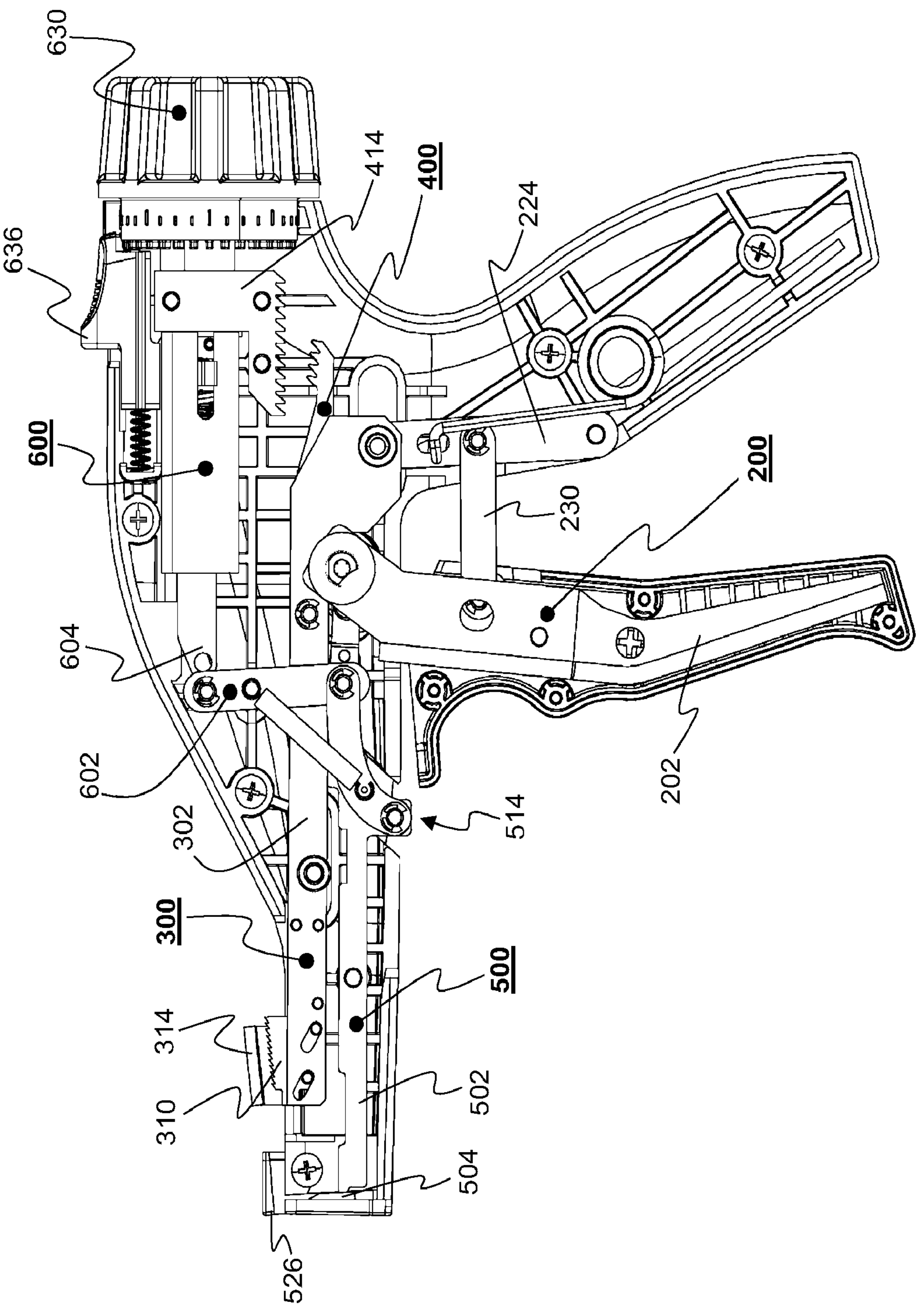
FIG. 4 illustrates a cross-section side view along A-A of the cable tie tool of FIG. 2 (*c*)
Figure 5:
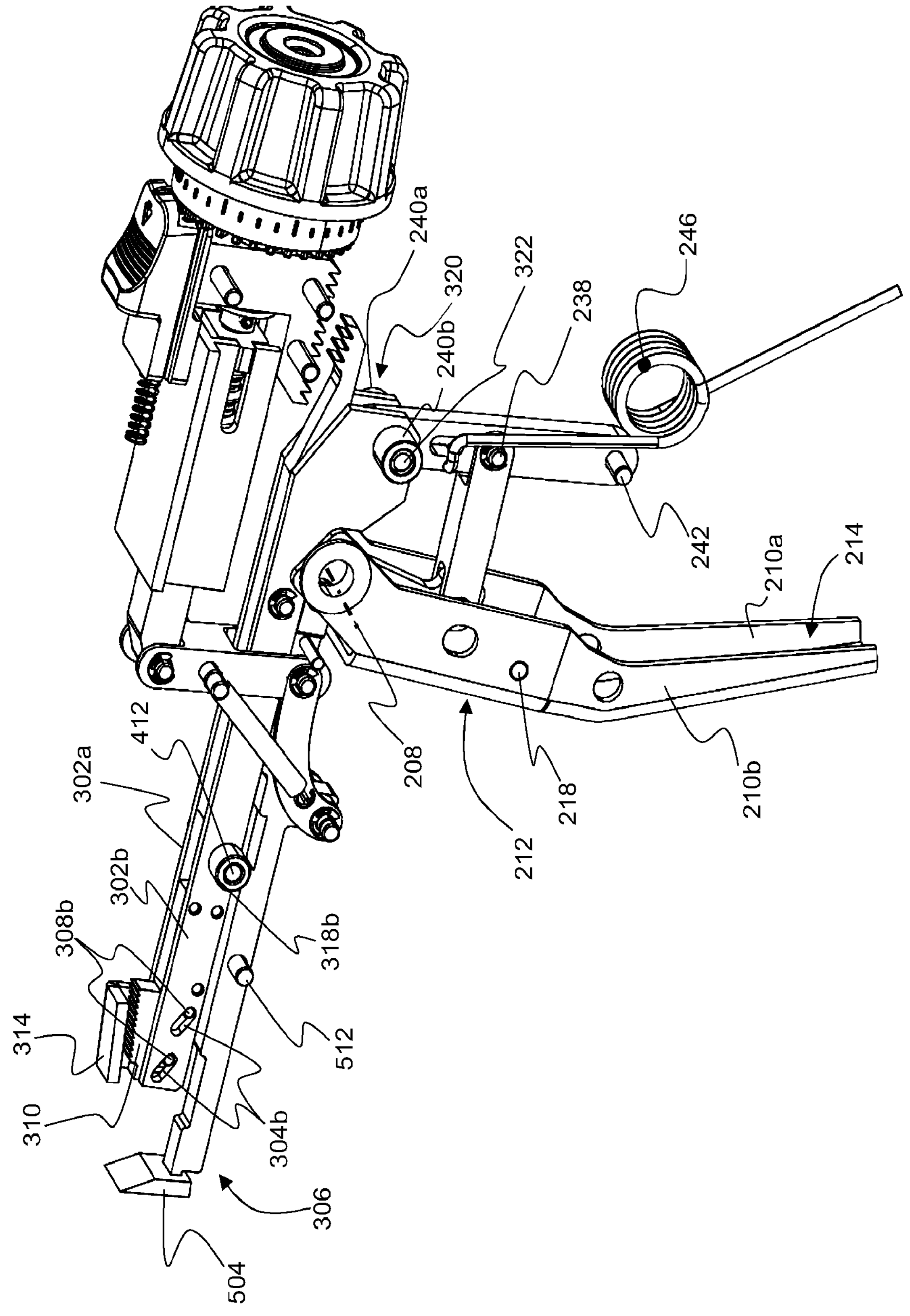
FIG. 5 illustrates a perspective rear view of the preferred embodiment of the assembled cable tie tool with the housing removed.
Figure 6:
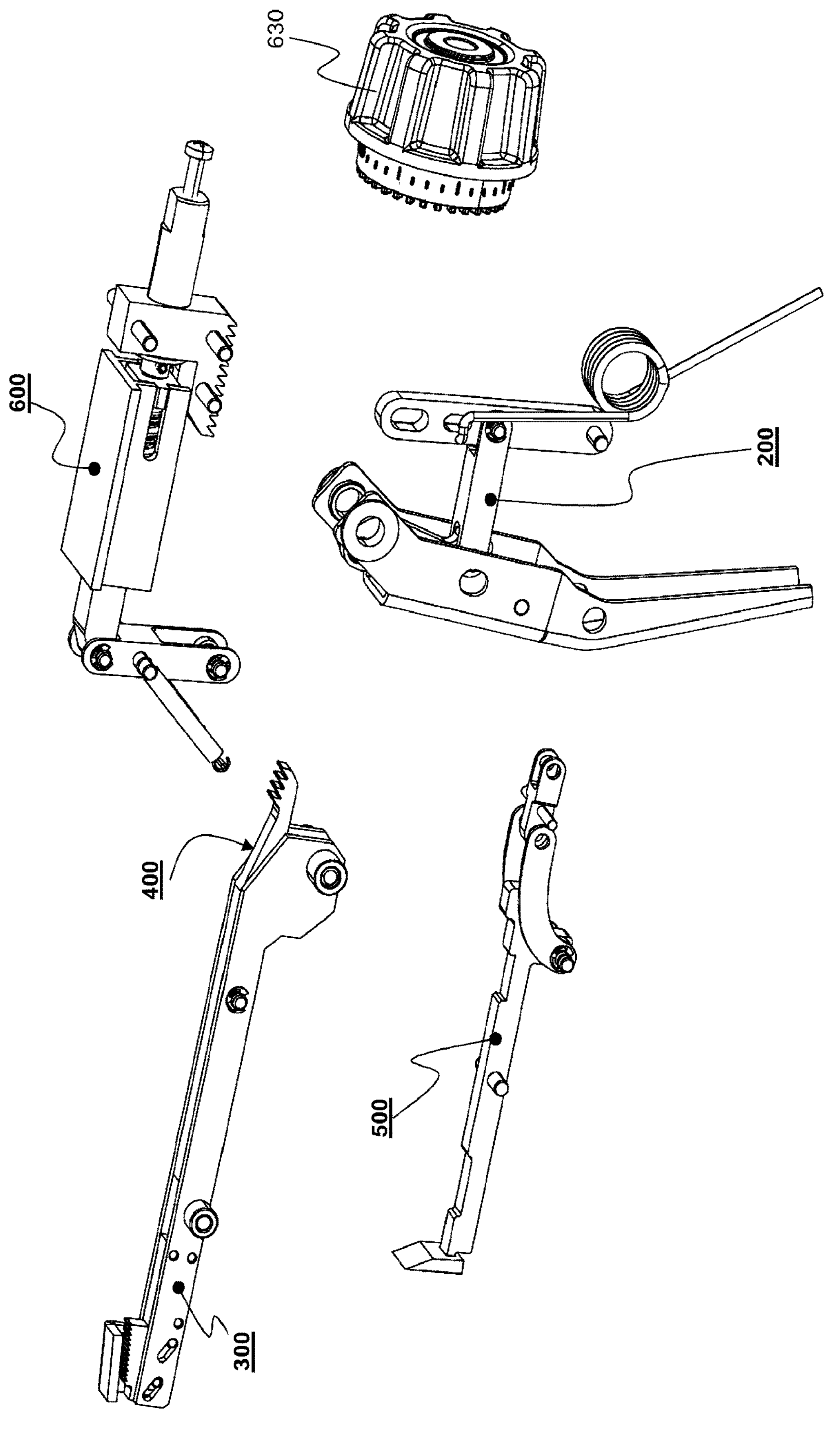
FIG. 6 illustrates a perspective rear view of the cable tie tool of FIG. 5 but exploded into the different groups of the mechanism.

FIG. 4 illustrates a cross-sectional side view of the cable tie tool 100 showing the different interconnected functional groups of the whole mechanism. Reference numerals only point to the general area of the respective group. Also, respective functional groups 200, 300, 400, 500 and 600 are partially interconnected and a part of one group may also be a component of, or at least operably coupled with, another group. FIGS. 5 and 6 show perspective rear views (assembled and exploded) of the tool mechanism without the housing 102, trigger housing portion 206, front cover portion 114 and blade guard 526. For ease of understanding, each functional group is now described separately.

(i) Trigger Mechanism

Figure 7:
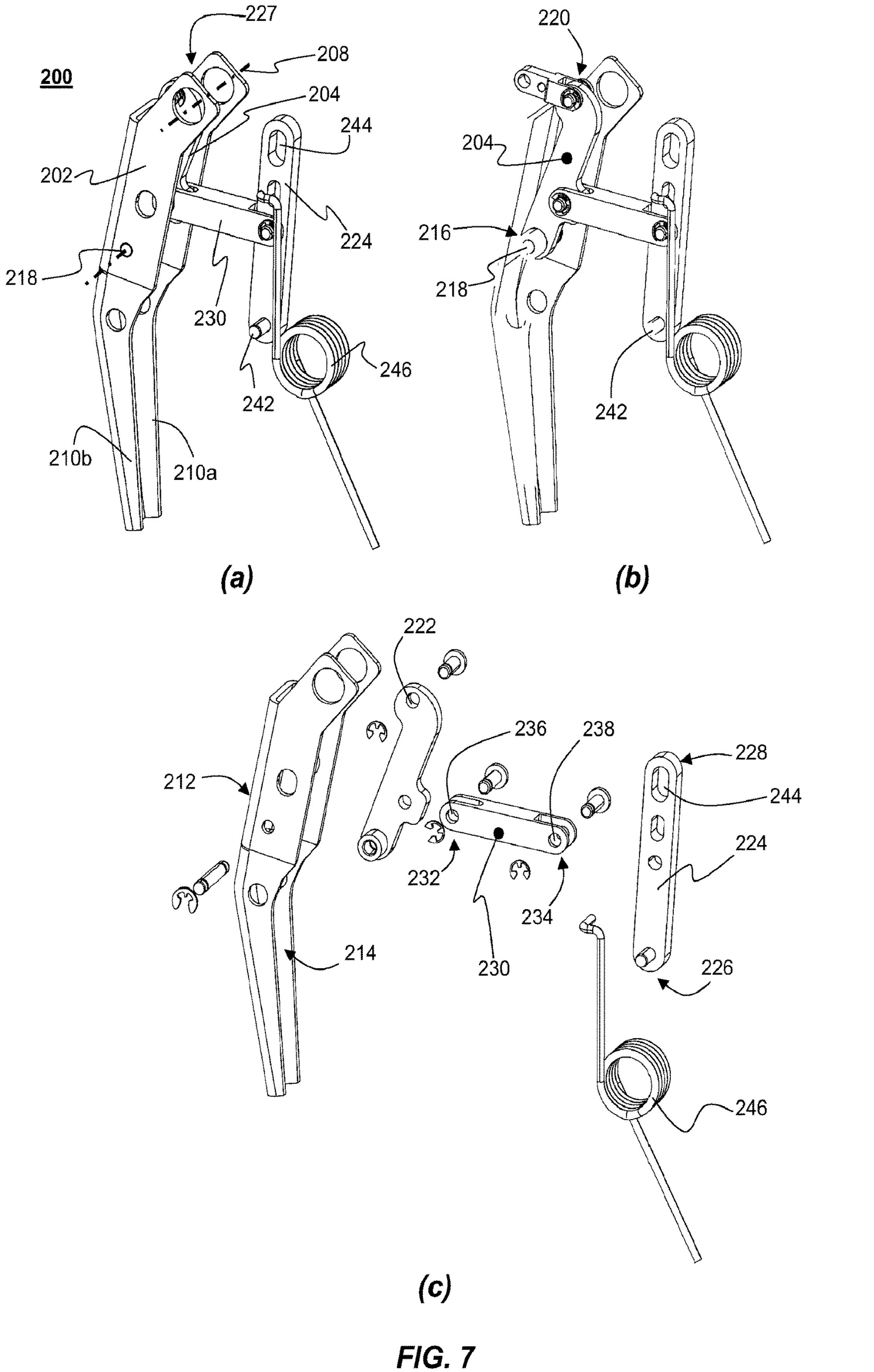
FIG. 7 illustrates the trigger mechanism of the preferred embodiment of the cable tie tool, (a) in a perspective side view, (b) a cross-sectional perspective side view and (c) an exploded perspective side view.

Referring now to FIG. 7, the trigger mechanism 200 is the main actuator of the cable tie tool 100. In operation, the user grips the handle portion 112 with the palm of one hand and uses the fingers of that hand to squeeze the trigger lever 202 towards the handle portion 112. When releasing the pressure provided by the user's fingers, the trigger lever 202 is urged back into its starting position via a biasing member 246 operably embedded into the handle portion 112 and coupled to the handle lever 224. Repeated movement of the trigger lever 112 will pull the tie tail back and apply a tension.

The trigger mechanism 200 is partially integrated into the handle portion 112 of the housing 102. An elongate trigger lever 202 is located forwardly of the handle portion 112 and pivotably mounted within the housing 102 at its proximal (or upper) end 227 so as to allow movement about a substantially horizontal pivot axis 208. The trigger lever 202 may include two substantially parallel spaced side faces 210*a,b* and a front face 212 forming a generally U-shaped profile with an elongate recess 214. Thus, the trigger lever 202 is movable from an initial forward position to a final rearward position and back to its initial forward position. An inner trigger link 204 extends upwardly within the elongate recess 214 of the trigger lever 202, a lower link end 216 of the inner trigger link 204 is pivotally joined to the trigger lever 202 for pivot movement about a substantially horizontal pivot axis 218. The upper link end 220 comprises an elongate aperture 222 suitable to operably link to the cutting mechanism 500 (described in more detail in a following section). A handle lever 224 is pivotally coupled at its lower (distal) lever end 226 at a pivot axis 242 within the handle portion 112 of housing 102 and its upper (proximal) lever end 228 is operably coupled to a proximal end of a pawl link 302 of the tension mechanism 300 (described in more detail in a subsequent section). The handle lever 224 is pivotally movable about its pivot axis 242 between a forward position (relative to the handle portion) and a rearward position within the handle portion 112. The handle lever 224 is biased towards its forward position by biasing member 246, such as, for example, a coil spring or a leaf spring or a torsion spring as shown in FIG. 7, or any other spring element suitable to urge the handle lever 224 into its forward position.

A forward end 232 of a short link 230 is pivotally joined to the inner trigger link 204 and a rearward end 234 of the short link 230 is pivotally joined to the handle lever 224. Each one of the forward end 232 and the rearward end 234 are configured to allow pivot movement about respective pivot axes 236 and 238. A trigger bearing 240*a,b* (see FIG. 5, comprising left and right bearing) may be provided at the coupling of the upper leaver end 228 of the handle lever 224 with the tension mechanism 300 (i.e. mounted to the proximal end of the pawl link 302 and engaged with the upper lever end 228 via an elongated aperture 244), movement of which is limited to a horizontal, linear reciprocal movement relative to the housing 102, i.e. the housing 102 is provided with a first cam or guide surface 116 (see FIG. 3) adapted to guidingly engage with respective trigger bearing 240*a,b* such that pivotal movement of the handle lever 224 about its pivot axis 242 is translated into to a linear movement of the operably coupled pawl link 302.

(ii) Tension Mechanism

The tension mechanism 300 is operably linked to and actuated by the trigger mechanism 200 in order to securely grip the inserted tie tail of the cable tie and pull the engaged tie tail backwards (i.e. towards the proximal end portion of the tool 100), thus, tightening the cable tie around the bundle of components until a predetermined maximum tension of the tie tail is reached.

Figure 8:
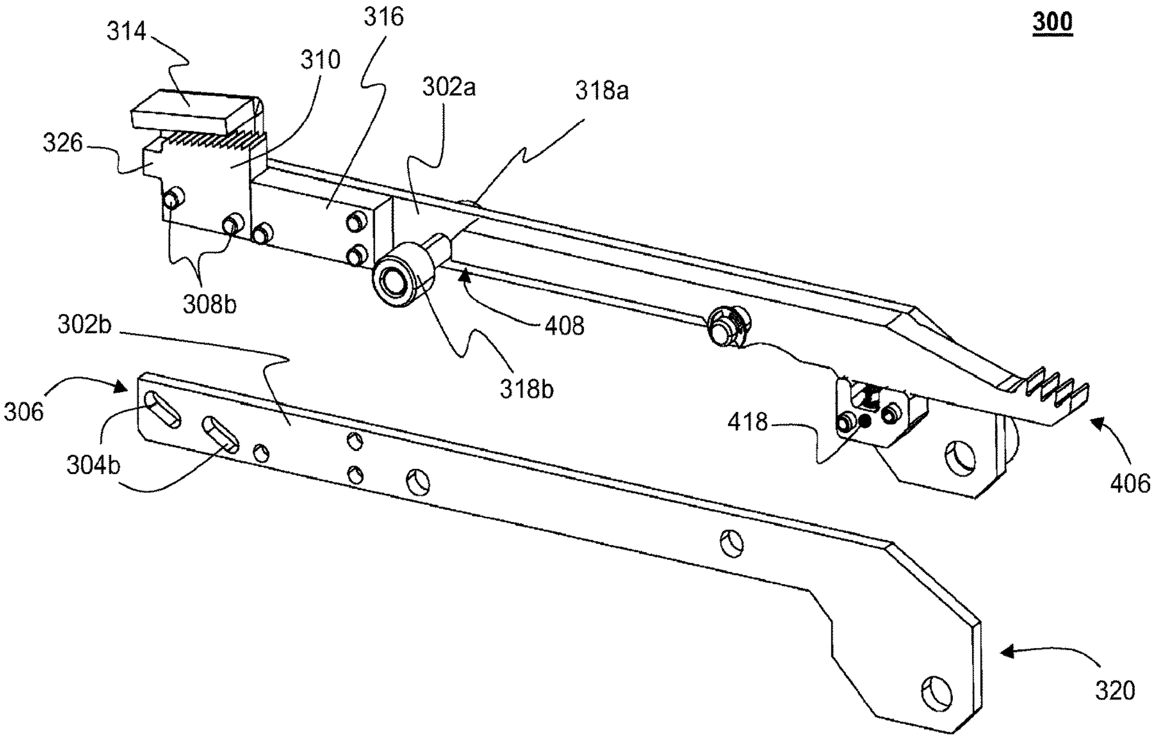
FIG. 8 illustrates the preferred embodiment of the tensioning mechanism group (a) in a perspective left side view with one pawl link member moved away, and (b) in a perspective right side view.
Figure 8:
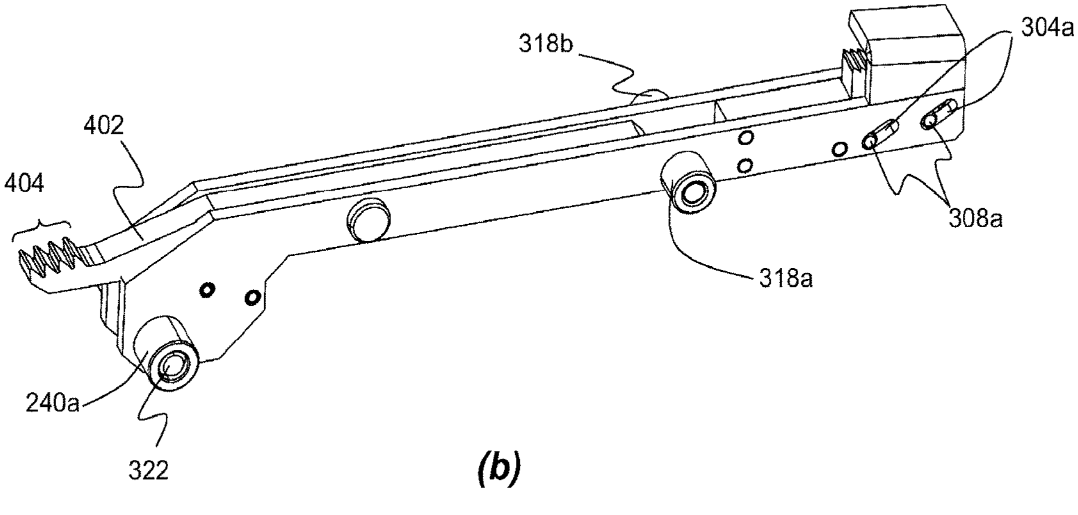

Referring now to FIG. 8, the tension mechanism 300 comprises a pawl link 302 mounted for horizontal, linear reciprocal movement relative to the housing 102. The pawl link 302 is guidingly supported for linear movement via suitable link bearings 318 configured to operably engage with a suitable second cam surface or guide 118 of the housing 102 (see FIG. 3). A gripping pawl 310 is operably mounted to the distal end portion 306 of the pawl link 302. Here, in this particular example embodiment, the gripping pawl 310 is slidably attached to the pawl link 302, so as to allow sliding movement between a lower, rearward (i.e. more proximal) position and an upper, forward (more distal) position relative to the pawl link 302. The distal end portion 306 of the pawl link 302 further comprises a backing plate 314 arranged so as to trappingly or grippingly engage the tie tail in cooperation with the gripping pawl 310. A spring member 316 provides a bias of the gripping pawl 310 towards its upper, forward, position, i.e. towards the backing plate 314. Here, any suitable biasing member 316 may be used to provide a spring bias. In this particular example embodiment, a coil spring 316*a* is embedded in a recess of a spring block 316*b* and arranged so as to push against the gripping pawl 310 from a proximal side, thus urging the gripping pawl 310 towards its upper, forward position (see FIG. 9 for more detail).

Figure 9:
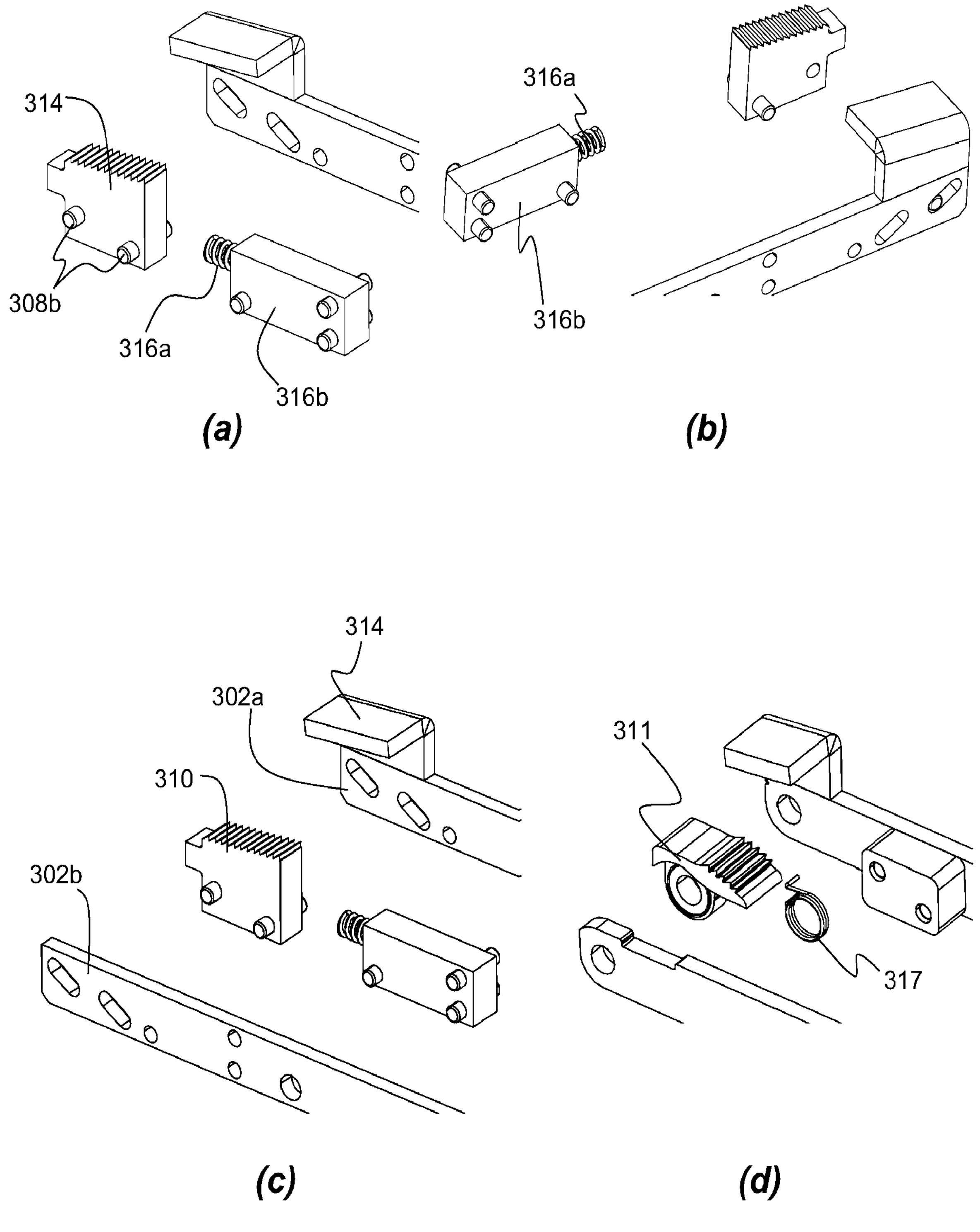
FIG. 9 illustrates a perspective close-up view of the distal end portion of the pawl link and exploded gripping pawl (a) in a perspective left side view with one pawl link member removed, (b) in a perspective right side view with one pawl link member removed, (c) a perspective left side view of the preferred embodiment of an exploded pawl link assembly including both pawl link members and (d) a perspective left side view of an alternative embodiment of an exploded pawl link assembly comprising a rotatably coupled pawl biased towards the backing plate.

As shown in more detail in FIGS. 9 (*a*) to (*c*), the distal end portion 306 of the pawl link 302 comprises two pairs of parallelly arranged guide apertures 304*a* and 304*b* adapted to receive respective pairs of guide member 308*a* and 308*b* of the gripping pawl 310 and defining the predetermined guide path of the gripping pawl 310 relative to the pawl link 302.

In a preferred embodiment, the pawl link 302 comprises two parallel arranged symmetrical pawl link members 302*a*, 302*b* (see FIG. 9 (*c*)) configured to sandwichingly mount the gripping pawl 310, as well as, spring member 316 therebetween. In this particular case, the gripping pawl 310 comprises two pairs of guide members 308*a* and 308*b*, each pair protruding into opposite directions of the other, which are then received by respective pairs of guide apertures 304*a*, 304*b* of the pawl link members 302*a*, 302*b*. It is understood that the guide aperture(s) 304*a*, 304*b* may define any suitable guide path (e.g. linear or curved), so as to optimise contact engagement between the backing plate 314 the inserted tie tail and the gripping pawl 310. Furthermore, as shown in FIG. 9(*d*), instead of the slidable gripping pawl 310, a pivotable gripping pawl 311 and respective bias, e.g. torsions spring 317, may be used within the same pawl link members 302*a*, 302*b*.

Figure 10:
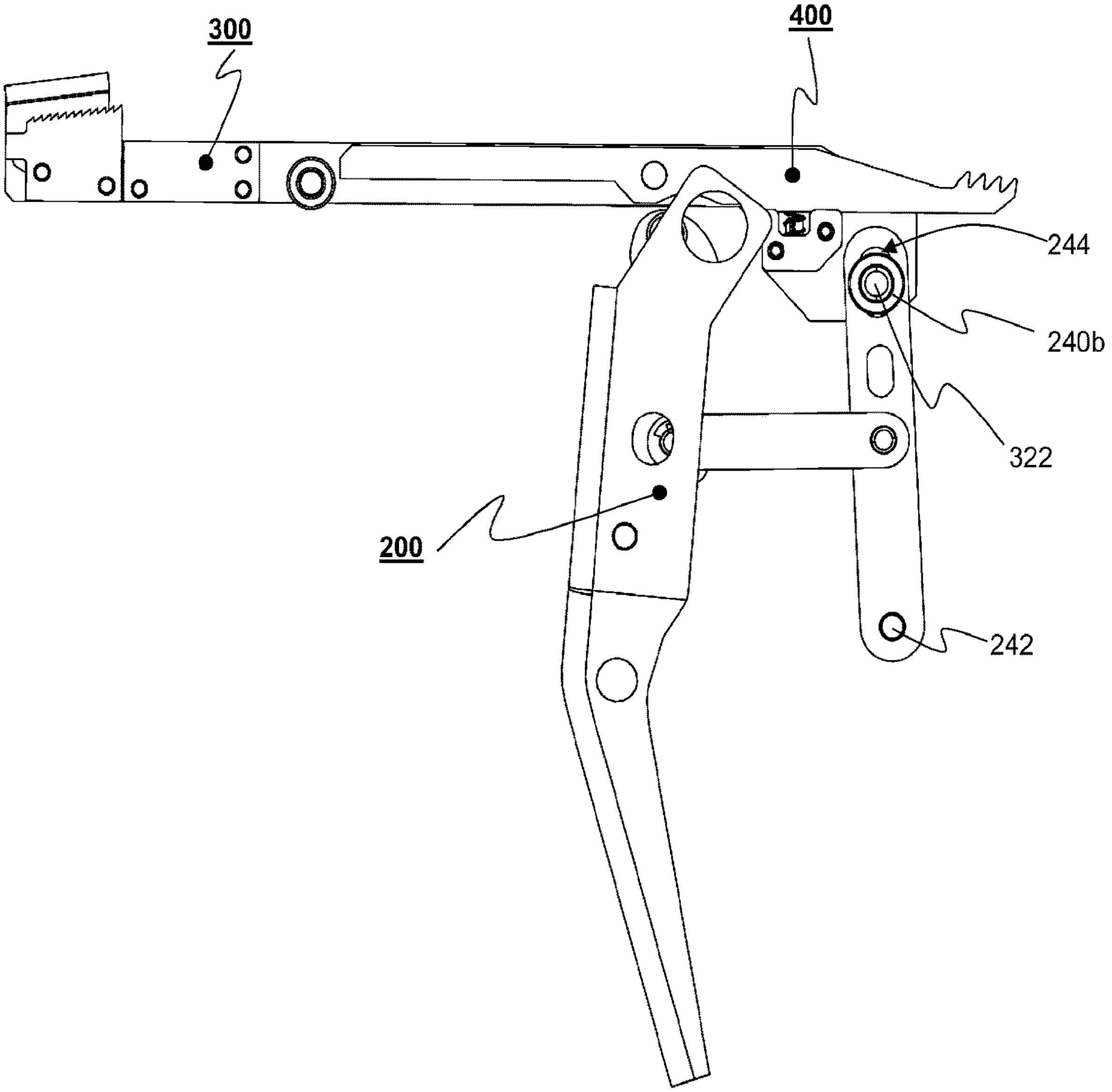
FIG. 10 illustrates a side view of the tensioning mechanism (and part of the locking mechanism) coupled with the trigger mechanism.

As illustrated in FIG. 10, a proximal end portion 320 of the pawl link 302 comprises a bearing pin 322 configured to receive the trigger bearings 240*a,b*, as well as, pivotally couple with the upper lever end 228 via its elongated aperture 244. The elongate aperture 244 is shaped so as to allow an arcuate trajectory of the handle lever 224 about its pivot axis 242.

Figure 19:
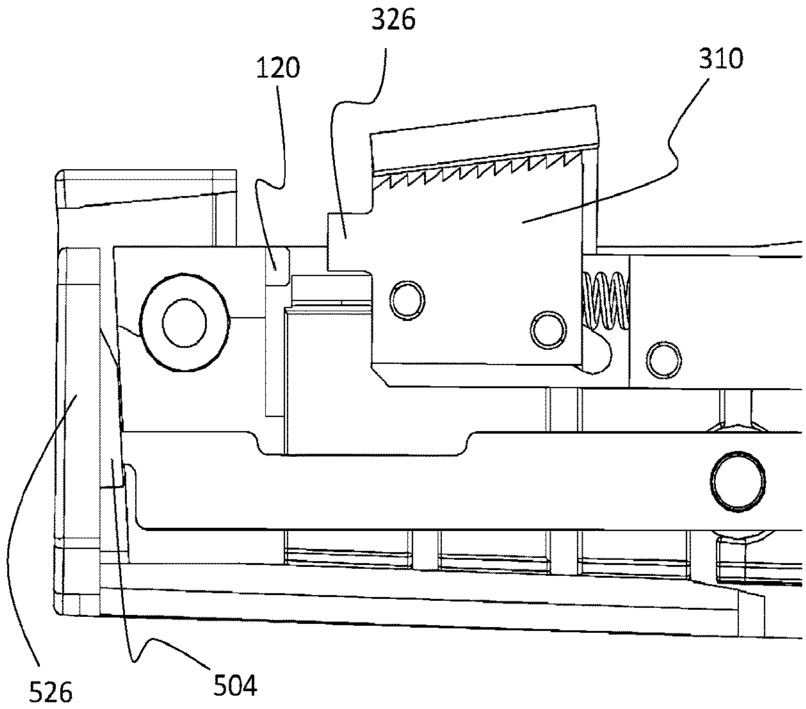
FIG. 19 illustrates a detailed cross sectional close up view of the distal end portion of the preferred embodiment of the tool with (a) the pawl link is retracted, and the pawl is moved towards the backing plate (pushed by the spring along the guide apertures) and (b) the pawl link in its starting (resting) position and the pawl engaged with a portion of the distal housing pushing the pawl back and away from the backing plate (ready to receive the cable tie tail)
Figure 19:
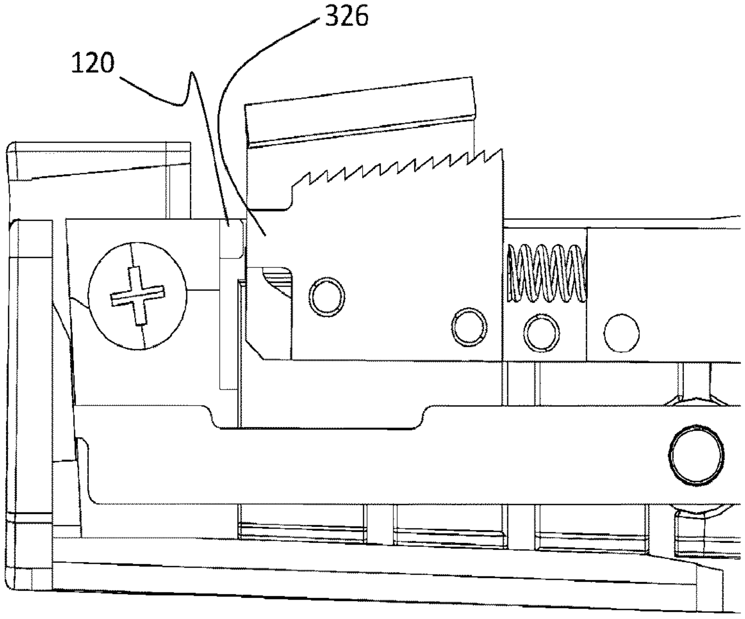

Furthermore, and with reference to FIGS. 19(*a*) and (*b*), the gripping pawl 310 may comprise a protrusion 326 projecting from its distal end and configured to engage with a respective engagement portion 120 of the distal housing end portion 106 so as to hold the gripping pawl 310 in its lower position against the biasing force of the spring member 316*a* when the pawl link 302 is in a starting position (i.e. forward position, see FIG. 19(*b*)). In this position, the gripping pawl 310 and the backing plate 314 provide an open gap between backing plate 314 and gripping pawl 310 allowing cable tie tails to be placed into the tool 100. When the trigger lever 202 is pulled back, the pawl link 302 is moved back, thus, disengaging gripping pawl 310 from the engagement portion 120, allowing the spring 316*a* to biasingly move the gripping pawl 310 forward and up towards the backing plate 314 (see FIG. 19(*a*)).

(iii) Locking Mechanism

The locking mechanism 400 is operably coupled with the tension mechanism 300 and its function is to lock the movement of the pawl link 302 (i.e. interrupt the backward movement of the pawl link 302) and initiate the actuation of the cutting mechanism 500 when reaching a predetermined tension applied to the tie tail during use. FIG. 10 shows the arrangement of the three involved functional groups, i.e. trigger mechanism 200, tension mechanism 300 and locking mechanism 400, within the tool 100 (housing 102 and other functional groups were removed for simplicity).

Figure 11:
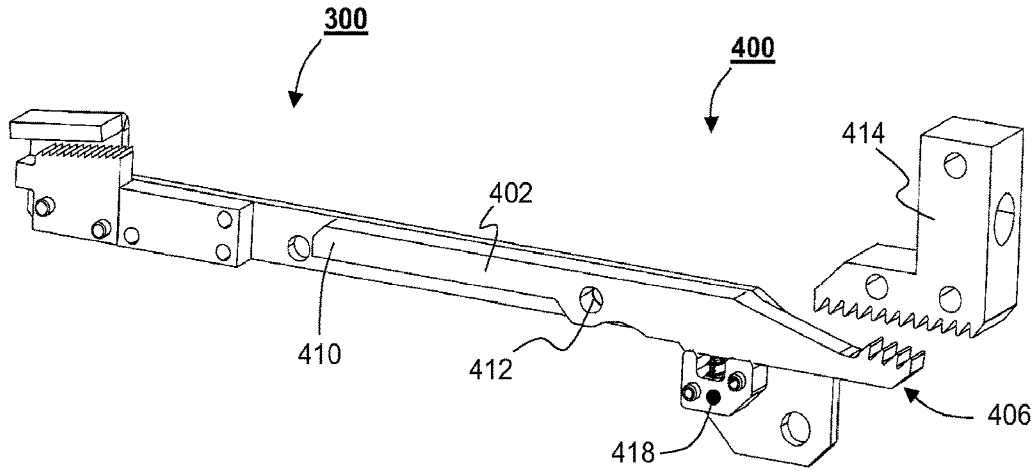
FIG. 11 illustrates (a) a perspective side view of the preferred embodiment of the locking mechanism coupled with the tensioning mechanism (one pawl link member has been removed) and (b) an exploded perspective view of the locking mechanism (without the rack member) and tensioning mechanism.
Figure 11:
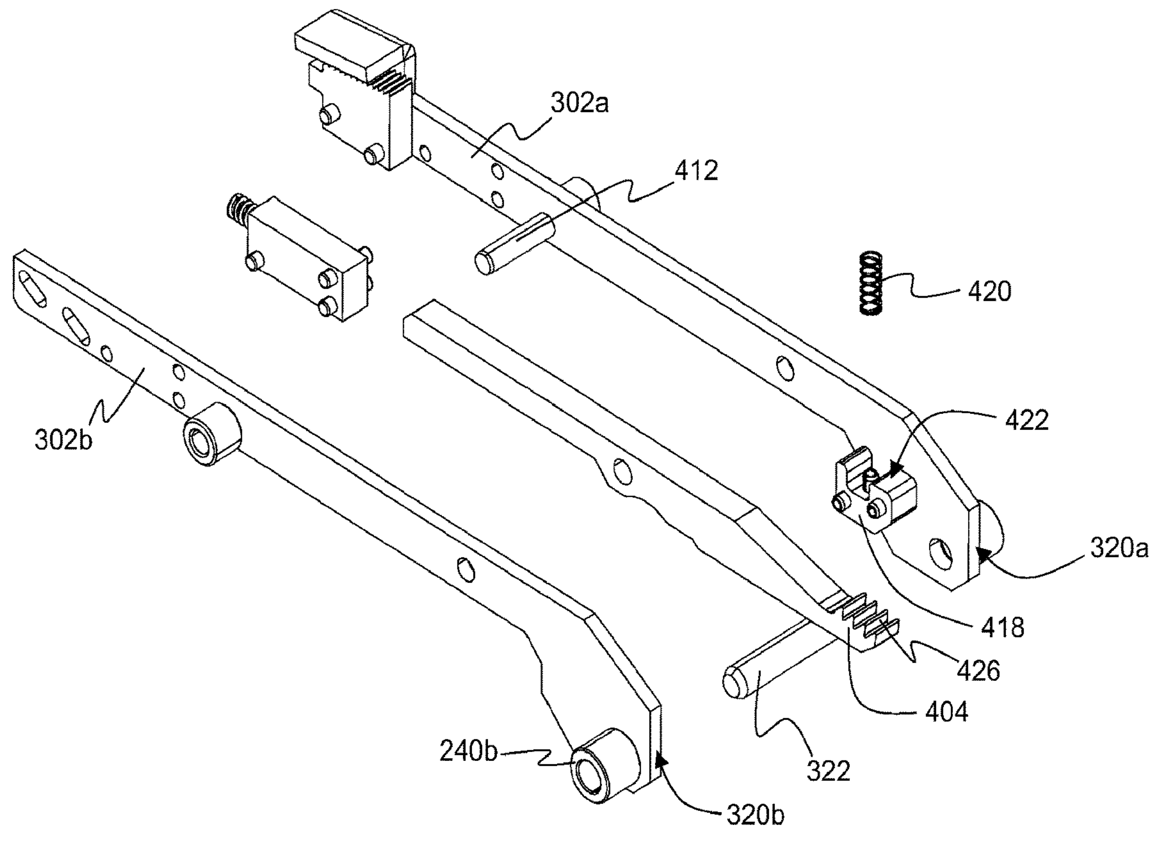
Figure 12:
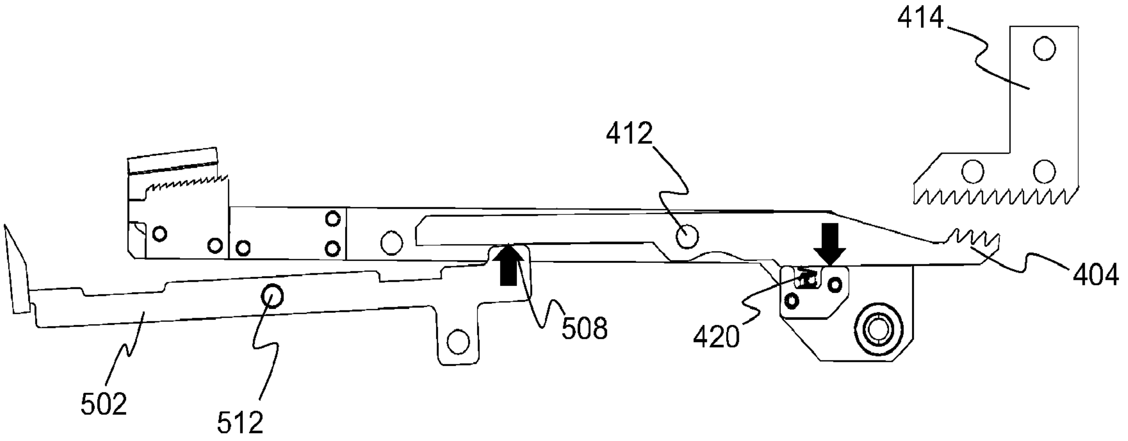
FIG. 12 illustrates the preferred embodiment of the locking mechanism (a) in an unlocked position and (b) in a locked position, with arrows indicating direction of movement of the locking lever.
Figure 12:
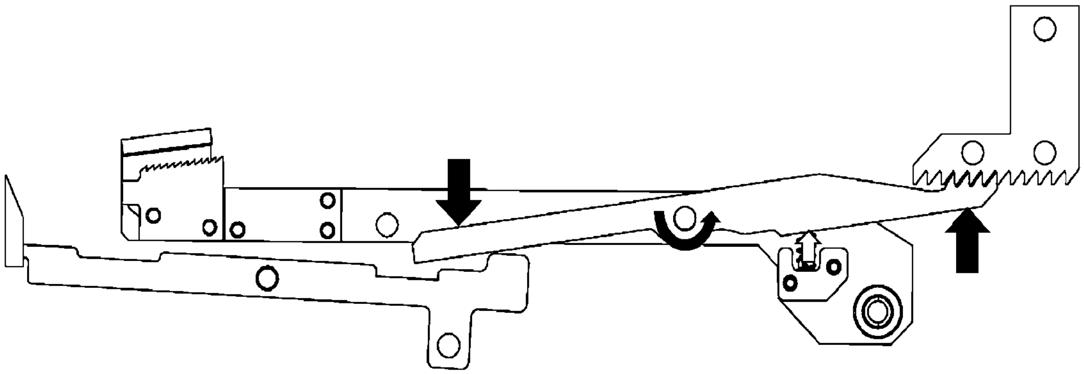
Figure 22:
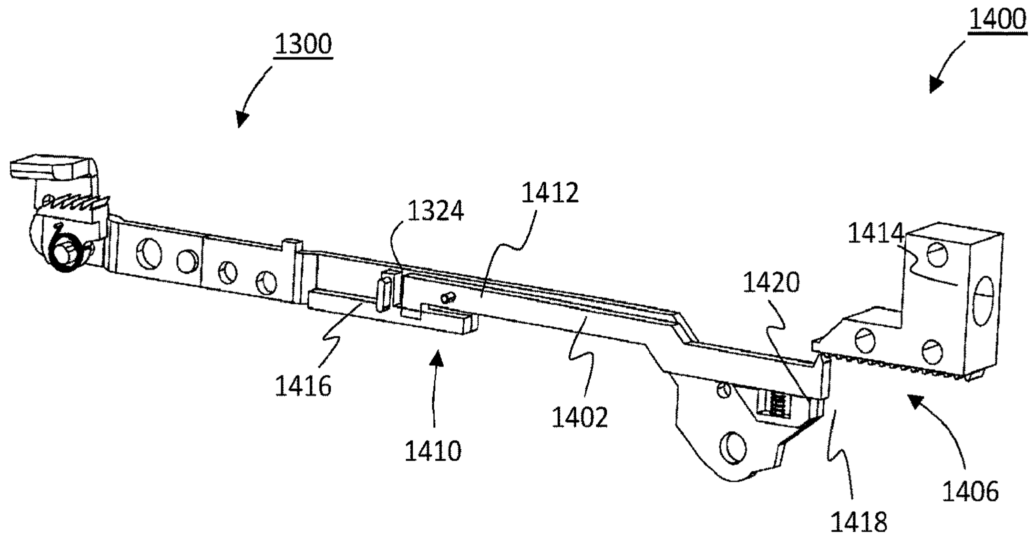
FIG. 22 illustrates (a) a perspective side view of the locking mechanism coupled with the tensioning mechanism (one pawl link member has been removed) and (b) an exploded perspective view of the locking mechanism (without the rack member) and tensioning mechanism of the alternative embodiment shown in FIG. 20.
Figure 22:
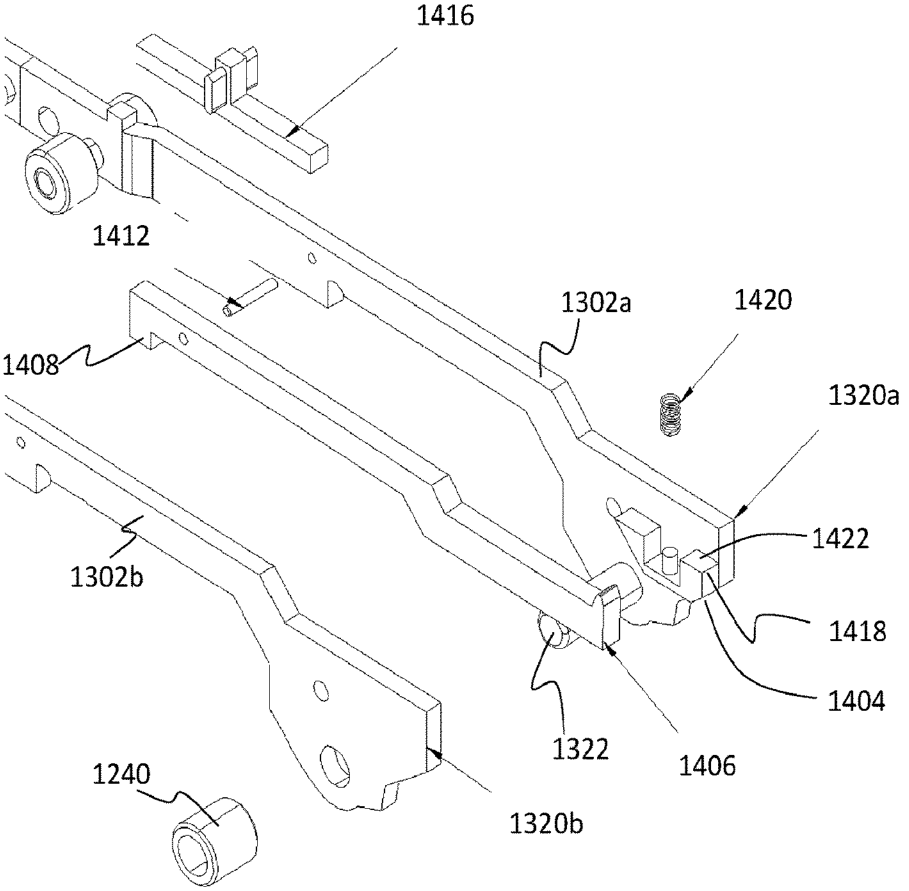
Figure 23:
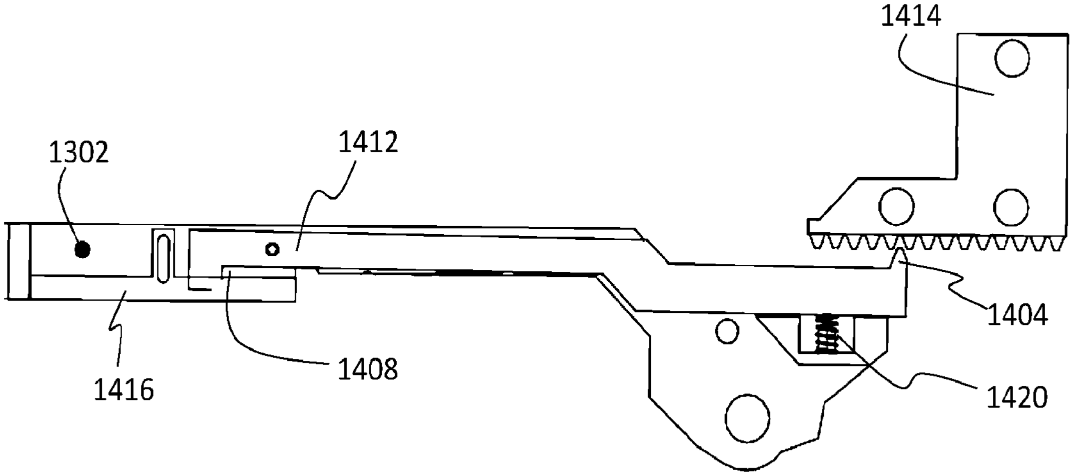
FIG. 23 illustrates the locking mechanism (a) in an unlocked position (sliding contact member up) and (b) in a locked position (sliding contact member down), with arrows indicating direction of movement of the locking lever of the alternative embodiment shown in FIG. 20.
Figure 23:
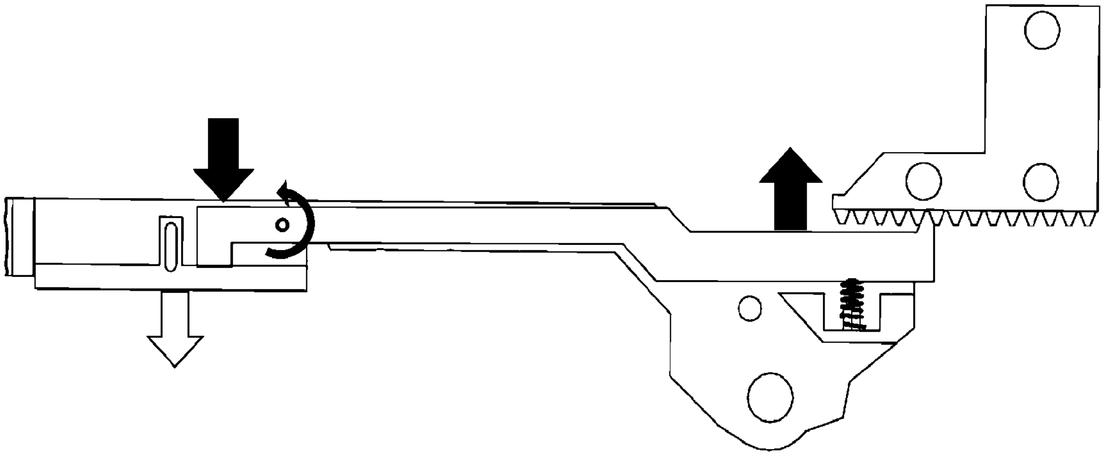

Referring now to FIGS. 11 and 12, the locking mechanism 400 is shown in combination with the tension mechanism 300. The locking mechanism 400 comprises a locking lever 402 arranged adjacent to and substantially in parallel with a proximal section of the pawl link 302 between a proximal lever end 406 and a distal lever end 410. A contact surface 408 (in an alternative embodiment the contact surface could also be a contact protrusion 1408, see FIG. 22) is facing downwards from its distal lever end 410 and a stop member 404 (i.e. a plurality of teeth) is protruding upwards from its proximal lever end 406 (i.e. in an opposite direction of the contact surface 408). In this particular example embodiment, the proximal end portion 406 of the locking lever 402 is longitudinally offset with regards to a distal end portion of the locking lever 402 (i.e. the stop member 404 is stepped downwards with respect to the distal end portion 410). The locking lever 402 is pivotally coupled with the pawl link 302 via a fulcrum pin 412, thus, allowing the locking lever 402 to rotate about the fulcrum pin 412 with respect to the pawl link 302 between an engaged, locked position (i.e. teeth of stop member 404 lockingly engage with corresponding teeth of rack member 414) and a disengaged, unlocked position.

Figure 13:
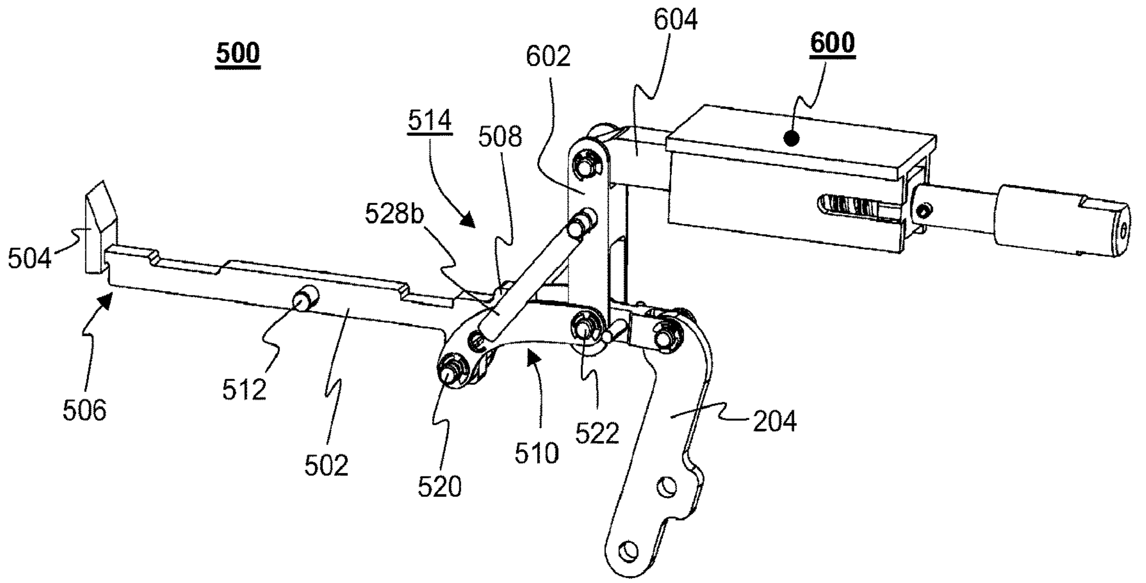
FIG. 13 illustrates a perspective side view of the preferred embodiment of (a) the cut-off mechanism operably coupled with the biasing mechanism and (b) an exploded cut-off mechanism including the lever link coupling the cutting mechanism with the biasing mechanism.
Figure 13:
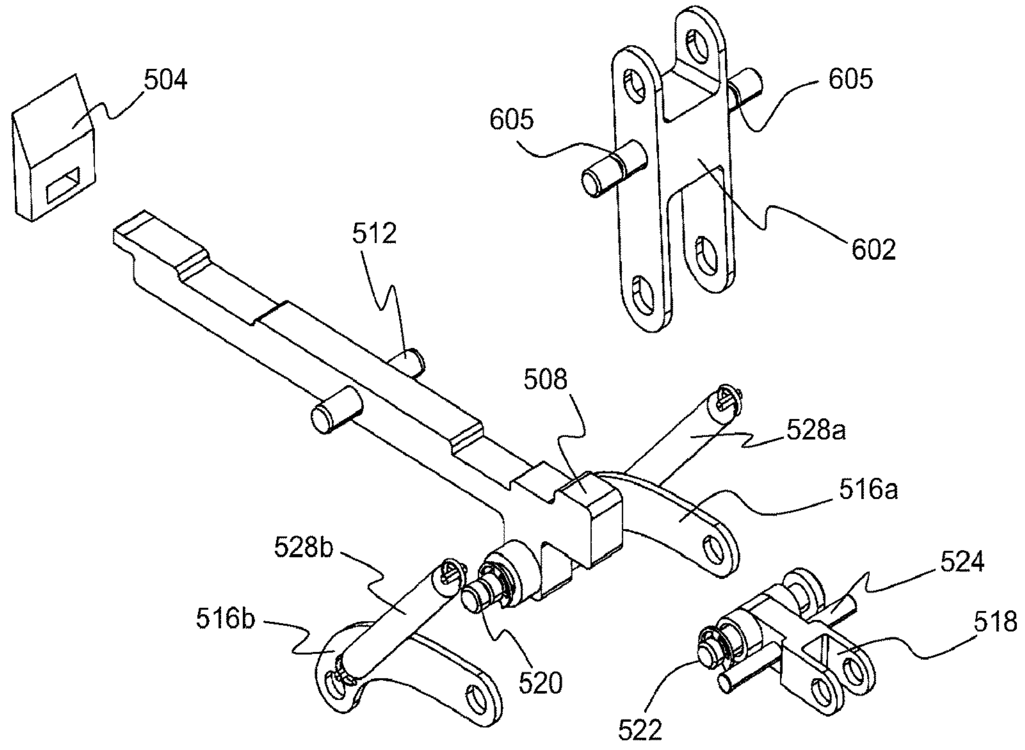
Figure 14:
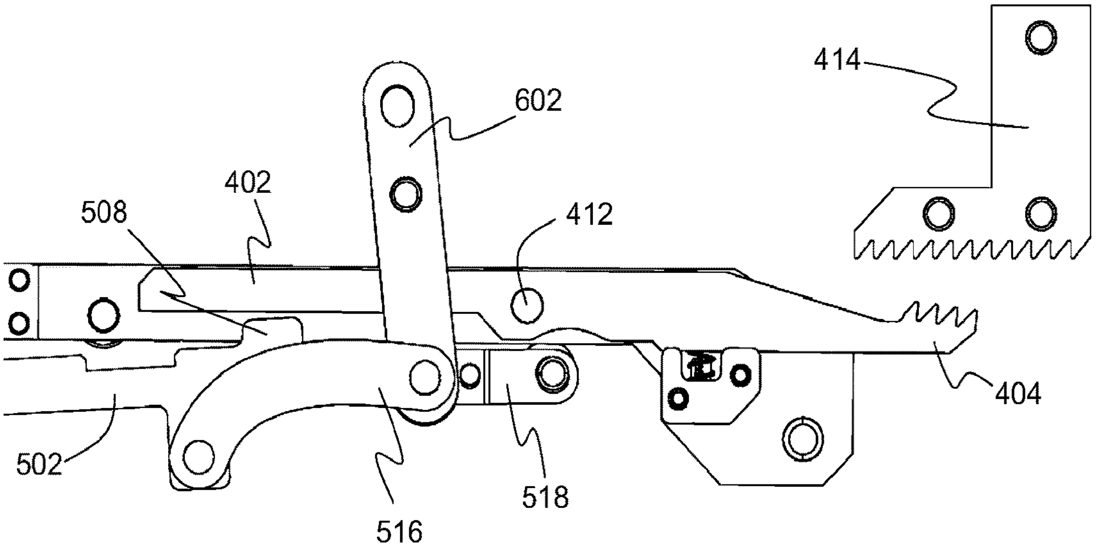
FIG. 14 illustrates the preferred embodiment of the locking mechanism and a portion of the cutting mechanism coupled with the locking mechanism (a) in an unlocked position (predetermined tie tail tension not reached) and (b) in a locked position (predetermined tie tail tension reached and tail cutting executed), with arrows indicating movement of the locking lever and cutting linkage.
Figure 14:
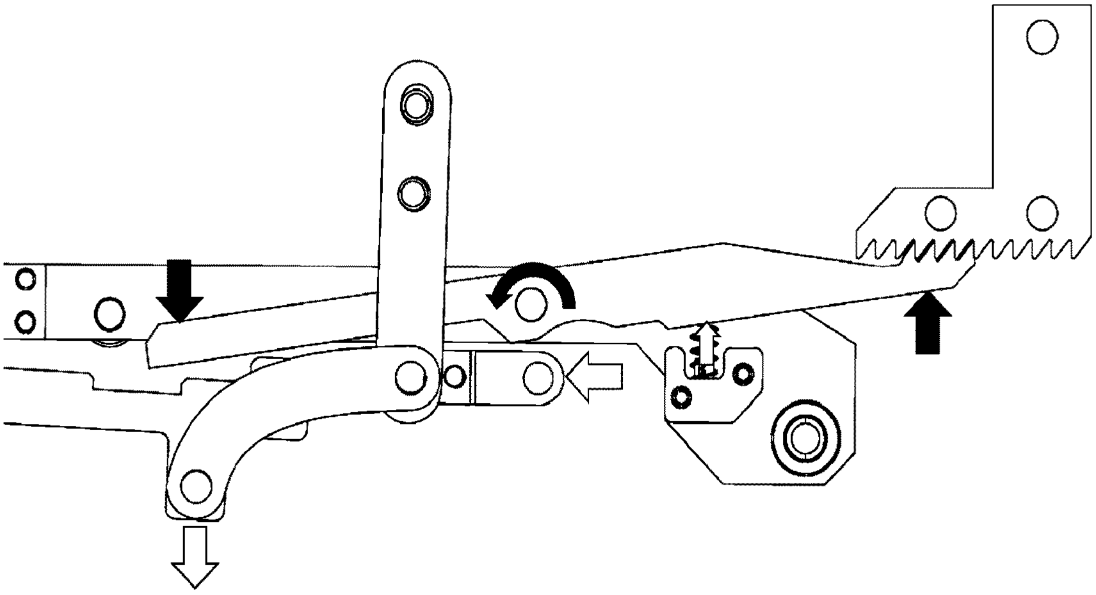

The lower contact surface 408 of the distal lever end 410 is configured to contactingly engage with a protrusion 508 situated on an upper surface of the cutting lever 502 (see also FIGS. 13 and 14). A rack member 414 is mounted to the housing 102 and within the biasing mechanism group 600 and orientated so as to operably face in a direction of the stop member 404 (e.g. an array of equidistantly arranged teeth). This allows locking engagement between the teeth of the stop member 404 and the teeth of the rack member 414 when the locking lever 402 is moved upwards.

A lever support member 418 is mounted to the proximal end portion 320 of the pawl link 302 and configured to support the proximal lever end 406 when in its unlocked position. The lever support member 418 comprises a spring element 420 operably embedded within the support surface 422 of the lever support member 418 and configured to bias the proximal lever end 406 towards its locked position (i.e. towards the rack member 414). This bias is counteracted by the protrusion 508 of the cutting lever 502 when the cutting lever is pivoted into its upper position (i.e. blade 504 is retracted). In the preferred embodiment, the locking lever 402 and lever support member 418 are "sandwiched" or operably installed between the two assembled pawl link members 302*a* and 302*b* (see FIG. 11(*b*)).

FIG. 12 illustrates the degrees of movement of the separate components of the locking mechanism 400 when moving from the unlocked position into the locked position. In particular, as shown in FIG. 12(*a*), the protrusion 508 of the cutting lever 502 counteracts the force applied to the proximal lever end 406 by the embedded coil spring 420, thus, holding the locking lever 402 in its unlocked position (disengaged from the rack member 414). When the cutting lever is pivoted and the protrusion 508 moves downward, the force applied by the coil spring 420 rotates the locking lever 402 about fulcrum pin 412 into engagement with the rack member 414 (see FIG. 12(*b*)). In particular, the downward movement of the protrusion 508 is initiated by the cutting lever 502 rotating downwards so as to move away from the distal lever end 410 allowing the coil spring 420 to rotate the locking lever 402 about its fulcrum pin 412 until the stop member 404 (i.e. teeth) engages with the rack member 414. When the cutting lever 502 rotates back, the protrusion 508 moves back up into contact with the distal lever end 410 urging the proximal lever end 406 out of locking engagement with the rack member 414 and back into contact with the lever support member 418.

The simple arrangement of the few components of the locking mechanism 400 provides a robust and highly repetitive lever mechanism that forms the basis for a consistently accurate predetermined maximum tension of the cable tie tail (i.e. the cable tie tension at which the tie tail is cut off) so as to produce clean cuts with no cutting protrusions.

(iv) Cut-Off Mechanism

The cut-off mechanism 500 cuts or severs the engaged cable tie tail when a predetermined tension is reached. As illustrated in the simplified assembled tool mechanism shown in FIG. 13(*a*), the cut-off mechanism 500 is directly coupled with the trigger mechanism 200 (via inner trigger link 204) and the adjustable biasing mechanism 600 (via fulcrumed lever link 602 about third fulcrum pin 606), as well as, operably engaged with the locking mechanism 400 (via protrusion 508).

Referring now to FIG. 13(*b*), the cut-off mechanism 500 is arranged within the barrel portion 104 of the housing 102 below and substantially parallel to the pawl link 302 and comprises a cutting lever 502 having a blade member 504 on its distal cutting lever end 506 and a protrusion 508 on its proximal cutting lever end 510. The cutting lever 502 is pivotally coupled to the housing 102 via fulcrum pin 512 so as to allow rotation of the cutting lever 502 about the fulcrum pin 512 relative to the housing 102, as well as, relative to the reciprocatingly movable pawl link 302. As shown in FIGS. 4 and 5, the blade member 504 is arranged forward of the distal housing end portion 106 or front cover portion 114 mounted to the tension mechanism 300 (i.e. forward of the gripping pawl 310 and backing plate 314) and is operably encased by a blade guard 526 (see FIG. 15).

The cutting lever 502 is configured to move between an upper position, i.e. blade member 504 is cuttingly engaged with the tie tail, and a lower position, blade member 504 is disengaged from the tie tail. When the blade member 504 is in the lower position, the protrusion is supportingly engaging the distal lever end 410 of the locking lever 402 of the locking mechanism 400, i.e. pushing the distal lever end 410 of the locking lever 402 into its upper position.

A cutting linkage 514 is coupled to the proximal cutting lever end 510 so as to operably link the cutting lever 502 with the inner trigger link 204 of the trigger mechanism 200. In particular, the cutting linkage 514 comprises a pivot link 516 (i.e. two parallel pivot link members 516*a,b*) directly and pivotally coupled to the proximal cutting lever end 510 via a pivot pin 520, and a sliding link 518 operably coupled between the pivot link 516 (via pivot pin 522) and the inner trigger link 204. The sliding link 518 is slidingly retained by a third cam surface or guide 122 within the housing 102 via a cam follower 524 so as to only allow reciprocating linear movement of the sliding link 518 between a forward (distal) position and a rearward (proximal) position. Here, the sliding link 518 is provided with a pin 524 configured to slidingly engage with the complementary cam guide 122 of the housing 102.

Tension springs 528, e.g. coils springs 528*a,b*, are provided between the pivot link 516 and the lever link 602 so as to bias the pivot link 516 and the distal cutting lever end 506 towards respective upper positions. In this particular example, the third fulcrum pin 606 laterally extends from the side wall of the lever link 602 also comprising respective circumferential grooves 605 for coupling with end loops of the tension springs 528*a,b*. These circumferential grooves 605 and respectively coupled tension springs 528*a,b* end loops allow for a smooth relative movement (sliding movement) between the tension springs 528*a,b* and the third fulcrum pin 606.

In addition, the bias provided by the tension springs 528*a,b* is adapted to maintain the locking lever 402 in a relatively horizontal position in order to avoid a premature and uncontrolled locking engagement between the stop member 404 and the rack member 414. Thus, the force from tension springs 528*a,b* pushing up on locking lever 402 is overcome when the sliding link 518 is moved forward (towards distal end) and the pivot link is pushingly rotated down (moving the protrusion 508 down) so as to allow the stop member 404 and rack member 414 to lockingly engage and the blade 504 to cut through the tie tail.

FIG. 14 illustrates the function in combination with the locking mechanism 400, where a force acting on the sliding link 518 (white arrow) is provided by the inner trigger link 204 (not shown). FIG. 14(*a*) illustrates the cutting lever 502 in its lower position (i.e. blade member 504 is disengaged) with no force acting on the sliding link 518. When the predetermined maximum tension is reached with the handle lever 224 pushed back against the housing 102, any additional pull on the trigger lever 202 will rotatingly push the inner trigger link 204 and sliding link 518 forward. As the pivot pin 522 of pivot link 516 is forced linearly forward, the pivot link 516 can only rotatingly move away about the pivot pin 522, thus, moving the proximal cutting lever end 510 downward (allowing the distal lever end 410 of the locking lever 402 to pivot down) and the blade member 504 upward. Thus, the force acting on the sliding link 518 is translated into a rotational movement of the cutting lever 502 about its fulcrum pin 512.

Figure 17:
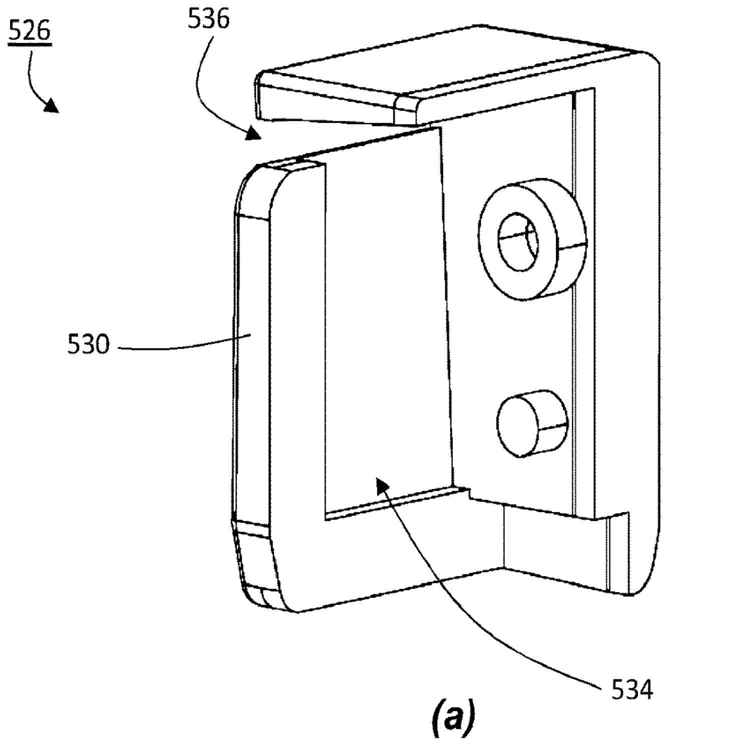
FIG. 17 illustrates an example embodiment of the blade guard (a) in a perspective side view and (b) in a cross sectional side view.
Figure 17:
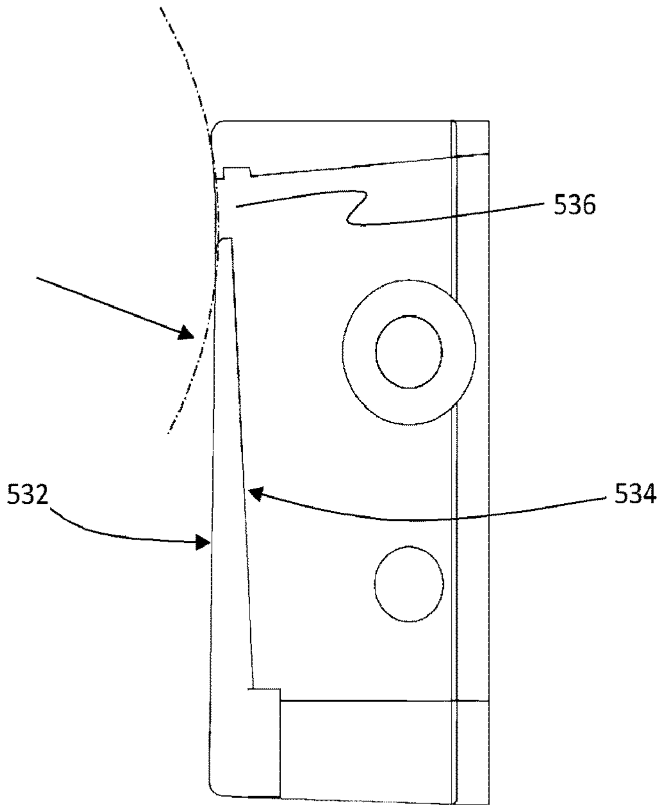

Referring now to FIG. 17, a blade guard 526 is illustrated in a detailed close up view. The blade guard 526 is configured to attach to the distal housing end portion 106 operably enclose the blade 504. In particular, the blade guard 526 comprises a front wall 530 having an outer front surface 532 and an inner front surface 534. The inner front surface 534 is shaped so as to provide a cam guide for the blade member 504, i.e. the inner front surface 534 is inclined at a predetermined angle relative to the outer front surface 532, such as, for example, an angle between 2° (degrees) and 5°, and preferably and angle of about 3.7° (degrees). Thus, during pivotal movement of the cutting lever 502, the blade member 504 slidingly follows the cam guide provided by the inclined inner front surface 534 of the blade guard 526. This "forces" the blade 504 to cut through the tie tail at a predetermined angle (e.g. 3.7°) so as to avoid, or at least minimise, the formation of potentially harmful burrs. Furthermore, the front wall 530 of the blade guard 526 has an aperture 536 for the cable tie to enter and engage with the tension mechanism 300 of the tool 100. The outer front surface 532 of the front wall 530 is concavely shaped around the aperture so as to further improve the cutting characteristics of the tool 100. The concave shaped region of the front wall 530 may provide for a "deeper" cut, so as to avoid or at least minimise any protruding ends at the cable tie head after cutting the cable tie tail.

In summary, the cut-off mechanism 500 provides a simplified and robust assembly for very precise and repeatable cutting action of the blade member 504.

(v) Adjustable Biasing Mechanism

The adjustable biasing mechanism 600 provides for a selectively adjustable biasing force setting the maximum tension applied to the cable tie at which the tie tail section is cut off. The adjustable biasing mechanism 600 is operably coupled with the cut-off mechanism 500 and the trigger mechanism 200 via a fulcrumed lever link 602 and operably incorporates the rack member 414 of the locking mechanism 400.

Figure 15:
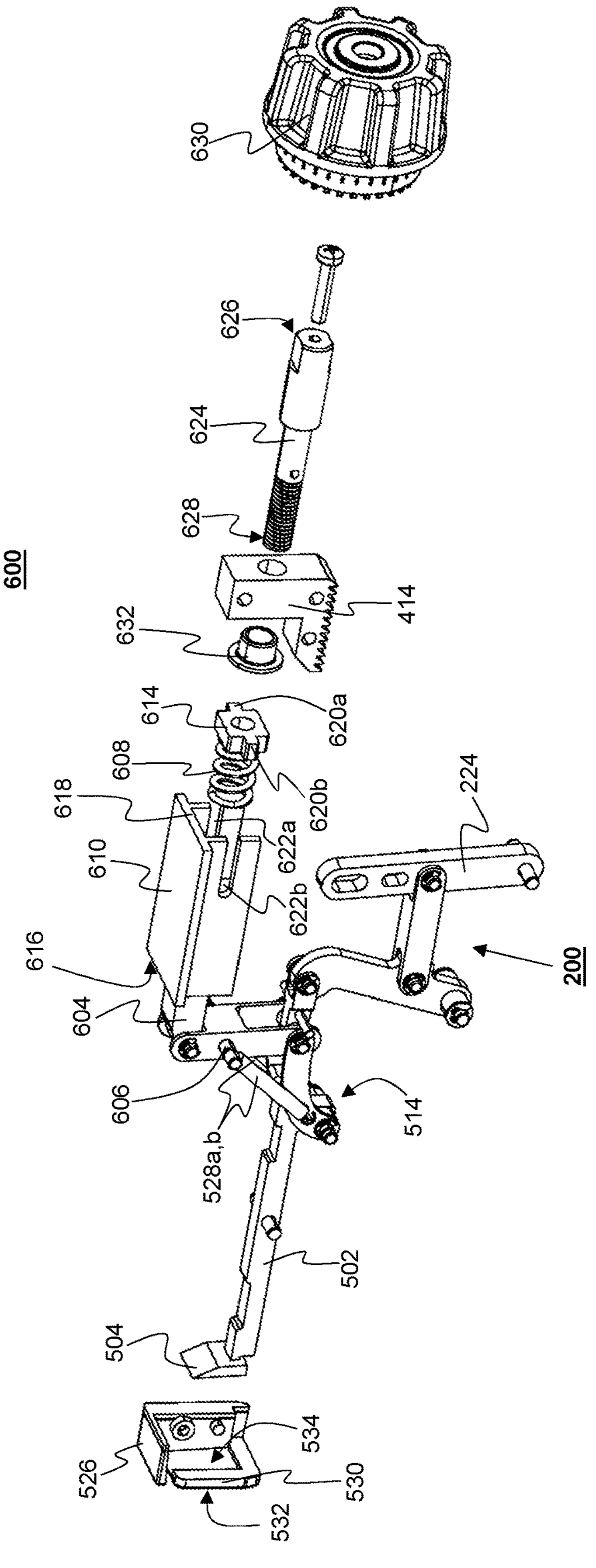
FIG. 15 illustrates a perspective side rear view of the preferred embodiment of the cutting mechanism operably coupled with the trigger mechanism and the exploded adjustable biasing mechanism.

Referring now to FIG. 15, the adjustable biasing mechanism 600 includes a spring housing 610 having a coupling member 604 extending away from a distal end 616 of the spring housing 610 (i.e. towards the distal cutting lever end 506) and is adapted to receive a spring member such as a coil spring 608, as well as, a plunger member 614. The plunger member 614 is slidably movable within the housing 610 so as to compress the torsion spring 608 when moving towards the distal end 616 of the housing 610 and expand the torsion spring 608 when moving back towards a proximal end 618 of the housing 610. Furthermore, the plunger member 614 comprises two radially opposing lateral protrusions 620*a*, 620*b* adapted to slide into respective guide grooves 622*a*, 622*b* (or longitudinal apertures) formed within the spring housing 610 so as to prevent rotation of the plunger member 614, during use. A lead screw mechanism 624 is operably coupled with the plunger member 614 and mounted within the housing 102 such that rotation of a proximal end portion 626 of the lead screw mechanism 624 is translated into linear axial movement of plunger member 614. The rotation of the proximal end portion 626 may be provided by the user via an adjustment knob 630 coupled to the proximal end portion 626 of the lead screw mechanism 624. Thus, when the user rotates the adjustment knob 630, the lead screw mechanism 624 moves the plunger member 614 distal or proximal within the spring housing 610 to either compress or expand the coil spring 608 within the spring housing 610. Lead screw mechanisms, such as the one illustrated, are well known in the art and are not described in any more detail. Also, any suitable variation or embodiment of such a mechanism (i.e. translating rotation into linear axial movement) may be used within the scope of this present disclosure.

The position of the plunger member 614 within its housing 610 determines the precompression of the torsion spring 608 and thus controls the biasing force provided by the adjustable biasing mechanism 600 via the fulcrumed lever link 602. A thrust bearing 632 may be provided between the lead screw mechanism 624 and the rack member 414 in order to prevent the transmission of any axial pressure to the adjustment knob 630.

Figure 16:
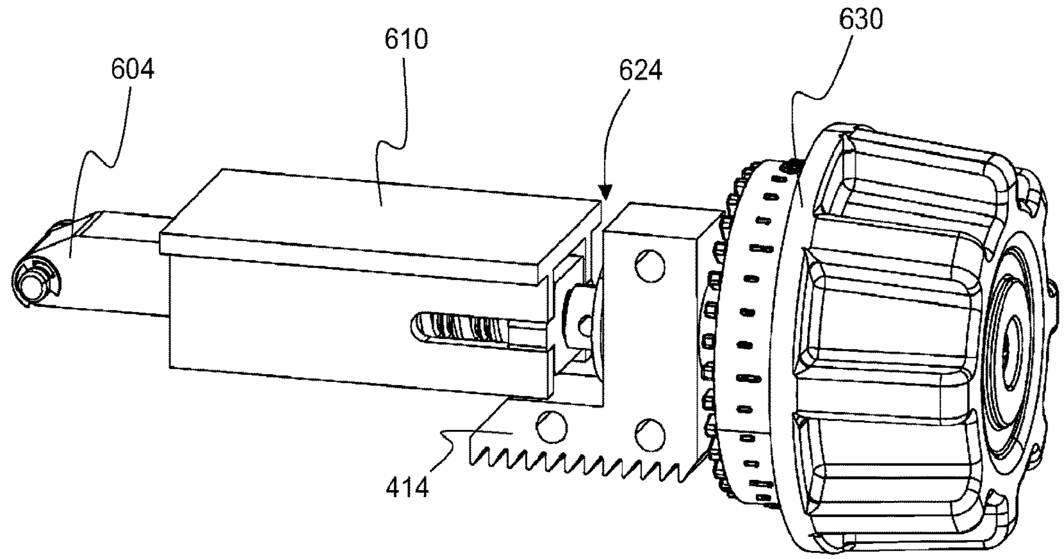
FIG. 16 illustrates a perspective side rear view of (a) the preferred embodiment of the assembled adjustable biasing mechanism of FIG. 15 and (b) an alternative embodiment of the assembled adjustable biasing mechanism shown in FIGS. 20 and 21.
Figure 16:
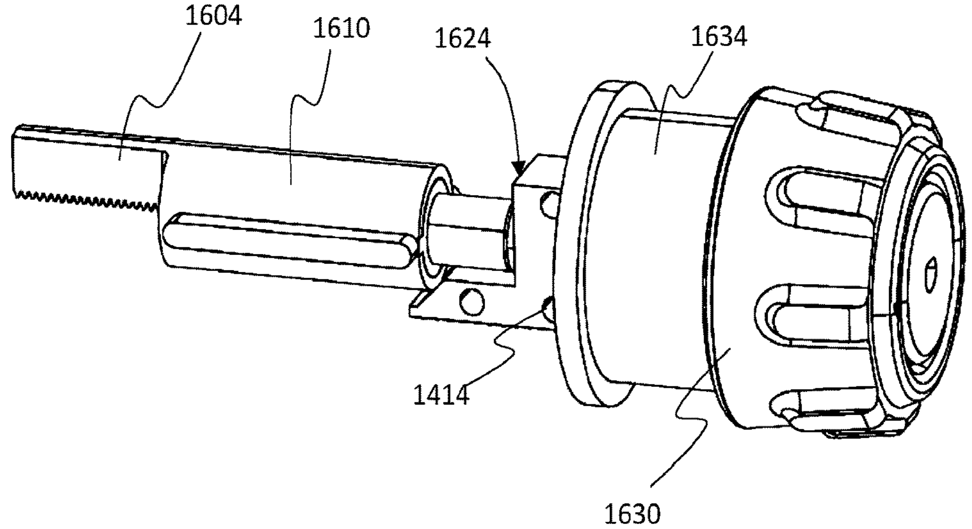

Additionally (i.e. optionally), a gear mechanism 1634 (see FIG. 16(*b*) and the alternative embodiment 1000 in FIGS. 20 to 23), such as a spin or torque multiplier, may be operably coupled between the adjustment knob 630 and the proximal end portion 626 of the lead screw mechanism 624. For example, the spin multiplier 634 is adapted to multiply relative rotational displacement of one axis end onto the other axis end so that a relatively small rotational movement of the adjustment knob 630 translates into a greater linear axial movement of the lead screw mechanism 624. Thus, standard threads can be used for the lead screw mechanism 624 while providing a user-friendly knob rotation during adjustment. For example, an epicyclic gear train or planetary gear set may be used for the spin multiplier 634 so as to align the rotational axes of the adjustment knob 630 and the lead screw mechanism 624.

It is understood by the person skilled in the art, that the adjustable biasing mechanism 600 of the present disclosure provides for a simplified and more robust assembly having a reduced number of components. Moreover, the use of a spin multiplier 634, such as, for example, an epicyclic gear, allows for a more user-friendly number of rotation of the adjustment knob 630 required to adjust the tension, as well as, an intuitive choice of the direction of rotation of the adjustment knob 630, i.e. a clockwise rotation for increasing precompression (i.e. increase cut-off tension of the tie tail) and an anti-clockwise rotation for decreasing precompression (i.e. reduce cut-off tension of the tie tail).

FIG. 16(*a*) shows the assembled adjustable biasing mechanism 600 including the rack member 414, but without any of the other mechanisms groups. FIG. 16(*b*) is an alternative assembled adjustable biasing mechanism 1600, including a rack member 1414, but without any of the other mechanisms groups.

Figure 18:
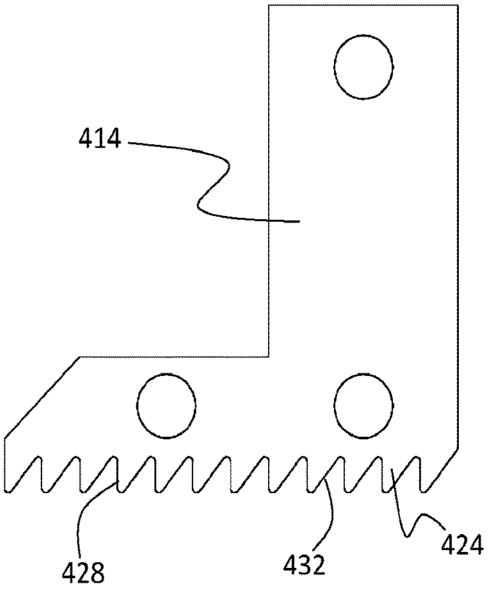
FIG. 18 illustrates close up view of (a) the rack member with a plurality of triangular teeth, (b) the stop member with a plurality of triangular teeth complementary to the teeth of the rack member, and (c) the teeth of the stop member lockingly engaged with the teeth (or spaces) of the rack member.
Figure 18:
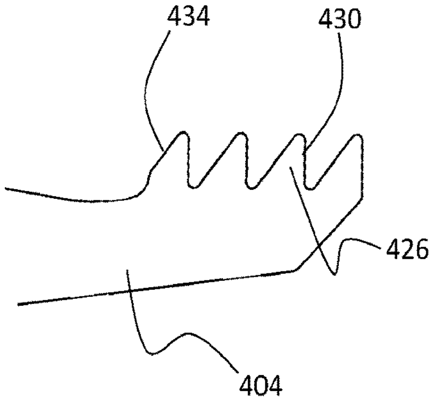
Figure 18:
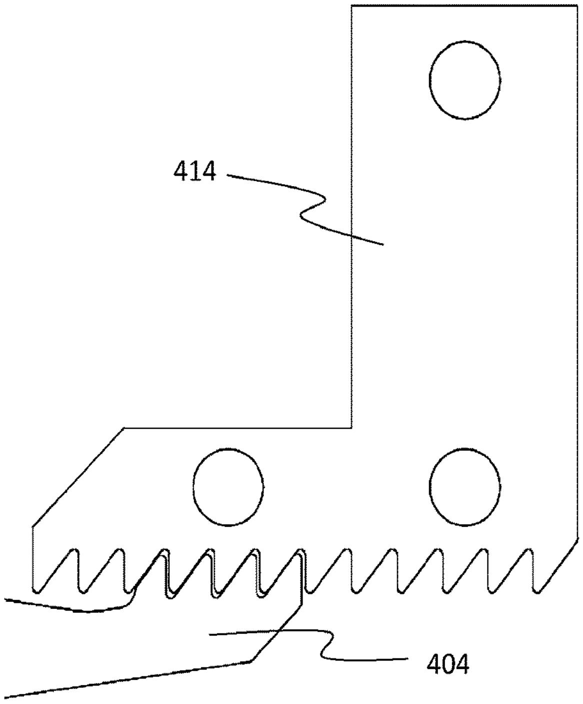

FIG. 18 illustrates a close up view of (a) the rack member 414 with a plurality of triangular teeth 424, (b) the stop member 404 with a plurality of triangular teeth 426 that are complementarily shaped to the triangular teeth 424 of the rack member 414, and (c) the teeth 426 of the stop member 404 are lockingly engaged with the teeth 424 (and spaces) of the rack member 414. Respective teeth 424 and 426 have been modified to allow a "well wedged" engagement. In particular, each one of the plurality of triangular teeth 424 and 426 comprise a vertical front surface 428, 430 and respective inclined back surface 432, 434, arranged such that the vertical front surfaces 428, 430 contactingly engage when in the locked position. Preferably, the angle between the front surface 430 of the teeth 426 of the stop member 404 when in the lower unlocked position and a vertical plane (perpendicular to the longitudinal axis 110) is in the region of 7° (degrees), however, any other suitable angle may be used to optimise engagement and disengagement between rack member 414 and stop member 404.

(vi) Operation of the Preferred Embodiment of the Cable Tie Tool 100

The operation of the cable tie tool 100 is now described with reference to FIGS. 4 and 5 summarising the individual functions described for each one of the mechanism 200, 300, 400, 500 and 600.

A user may first set a desired cut-off tension for the cable tie looped around the components by rotating the adjustment knob 630 and changing the precompression of the torsion spring 608 within the spring housing 610. The precompression of the spring 608 will set a predetermined bias applied via the fulcrumed lever link 602 and coupling member 604 of the spring housing 610.

A tie tail of a looped cable tie is then inserted through the blade guard aperture 536 and distal housing cover 114 and into engagement with the gripping pawl 310 and backing plate 314. When the user squeezes the trigger lever 202, the pawl link 302 moves back “releasing” the gripping pawl 310 engagement with the engagement portion 120 allowing the gripping pawl 310 to slide up and forward and into gripping engagement with the tie tail. The engaged gripping pawl 310 and tie tail are then pulled back by the handle lever 224 via the pawl link 302, thus, pulling the tie tail backwards towards the proximal housing end portion 108 and closing the cable tie loop around the components. Upon release of the trigger lever 202, the biased handle lever 224 pushes the trigger lever 202 back into its starting position, ready for the user to squeeze the trigger lever 202 again to further tighten the loop until the tension in the tie tail gradually increases.

When the pre-set tension within the tie tail is reached, any additional force on the trigger lever 202 is translated into a forward rotation of the inner trigger link 204 (via handle lever 224 and short link 230). The forward movement of the inner trigger link 204 pushes the sliding link 518 forward and rotates the pivot link about its pivot pin 522, subsequently rotating the proximal cutting lever end 510 downward about fulcrum pin 512. This movement will remove the support for the distal lever end 410 of the locking lever 402, which is now “free” to be rotated about its fulcrum pin 412 by the coil spring 420 embedded in the lever support member 418 moving the distal lever end 410 down and the stop member 404 upward into locking engagement with the rack member 414. The tension mechanism 300 is now locked into position while the blade member 504 is moved upward (along inclined inner front wall surface 534 of the blade guard 526) to cut through the tie tail.

The sudden release of the tension in the cut tie tail removes the force counteracting the spring biased coupling member 604 and lever link 602, such that the lever link 602 rotates back moving the sliding link 518 back and the pivot link 516 up, thus, pushing the distal lever end 410 back up and rotating the stop member 404 of the locking lever 402 out of engagement with the rack member 414. The tension mechanism 300 and pawl link 302 are now free to reciprocatingly move within the barrel portion 104 so that the gripping pawl 310 can be moved backward when contactingly engaging with the engaging portion 120 of the distal housing end portion 106 and disengage from the cut tie tail. The movements of each one of the involved components is timely coordinated such that locking and cutting is practically simultaneous, therefore, preventing any sudden pull-back of the gripping pawl 310 and pawl link 302 and allowing a very clean cut through the tie tail before the pawl link 302 is released again.

(vii) Alternative Embodiment of the Cable Tie Tool 1000

The embodiment of the tool shown in FIGS. 20, 21, 22 and 23, is an alternative embodiment of the cable tie tool 1000 of the present disclosure, comprising a tool mechanism similar to the tool mechanism of the preferred embodiment of the tool 100, but with a few components being replaced by alternative components or couplings. Equivalent component parts are numbered with the same reference numbers as for the preferred embodiment of the cable tie tool 100, but with a ‘1’ preceding the reference numbers. i.e. housing 102 will be referenced housing ‘1102’ and so on. Only substantial differences (e.g. different component parts) to the preferred embodiment are described in any further detail. All other functions are the same.

Figure 20:
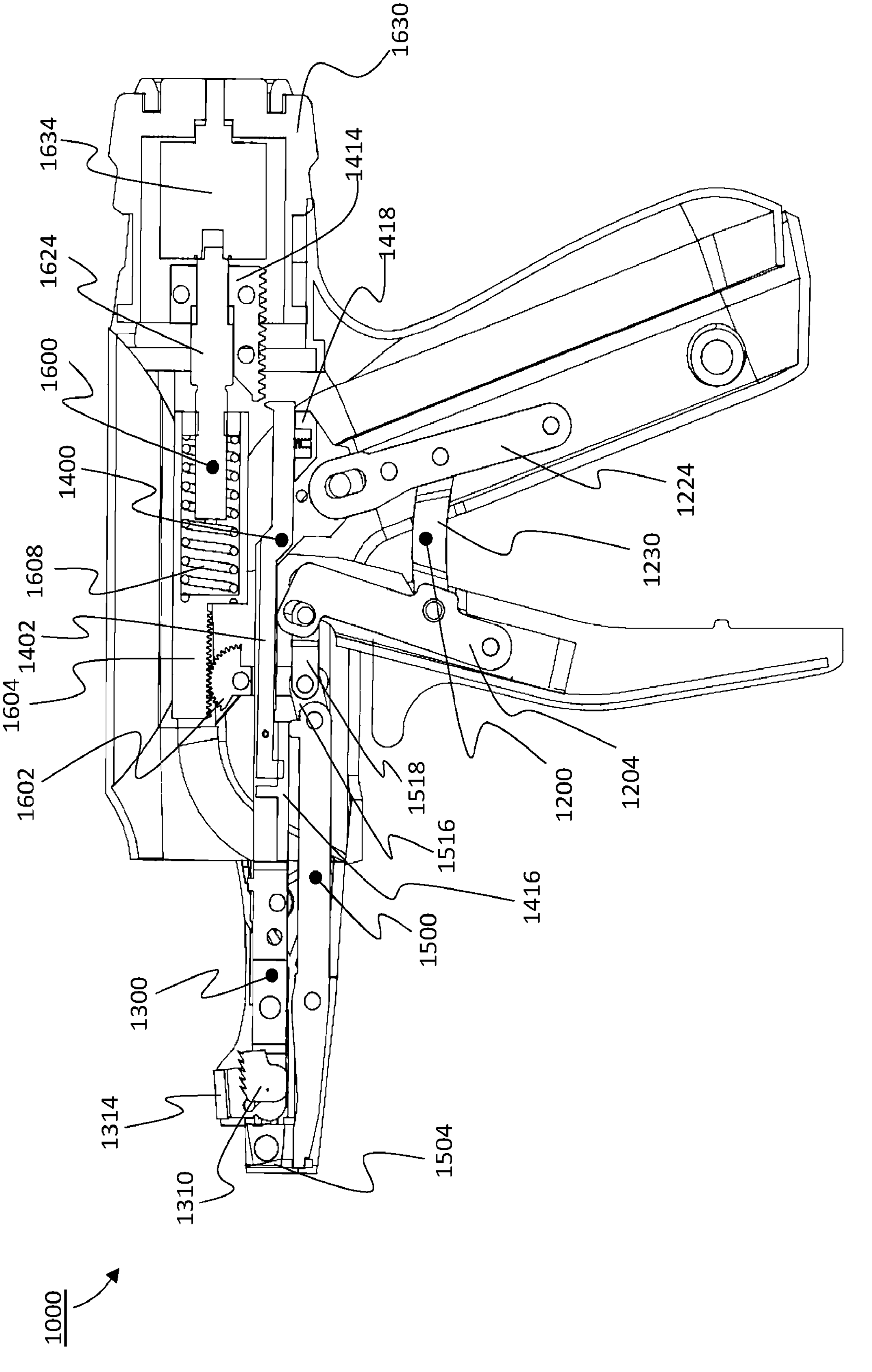
FIG. 20 illustrates an alternative embodiment of the cable tie tool utilising a rack and pinion coupling, as well as, a sliding member between the locking mechanism and the cutting mechanism.
Figure 21:
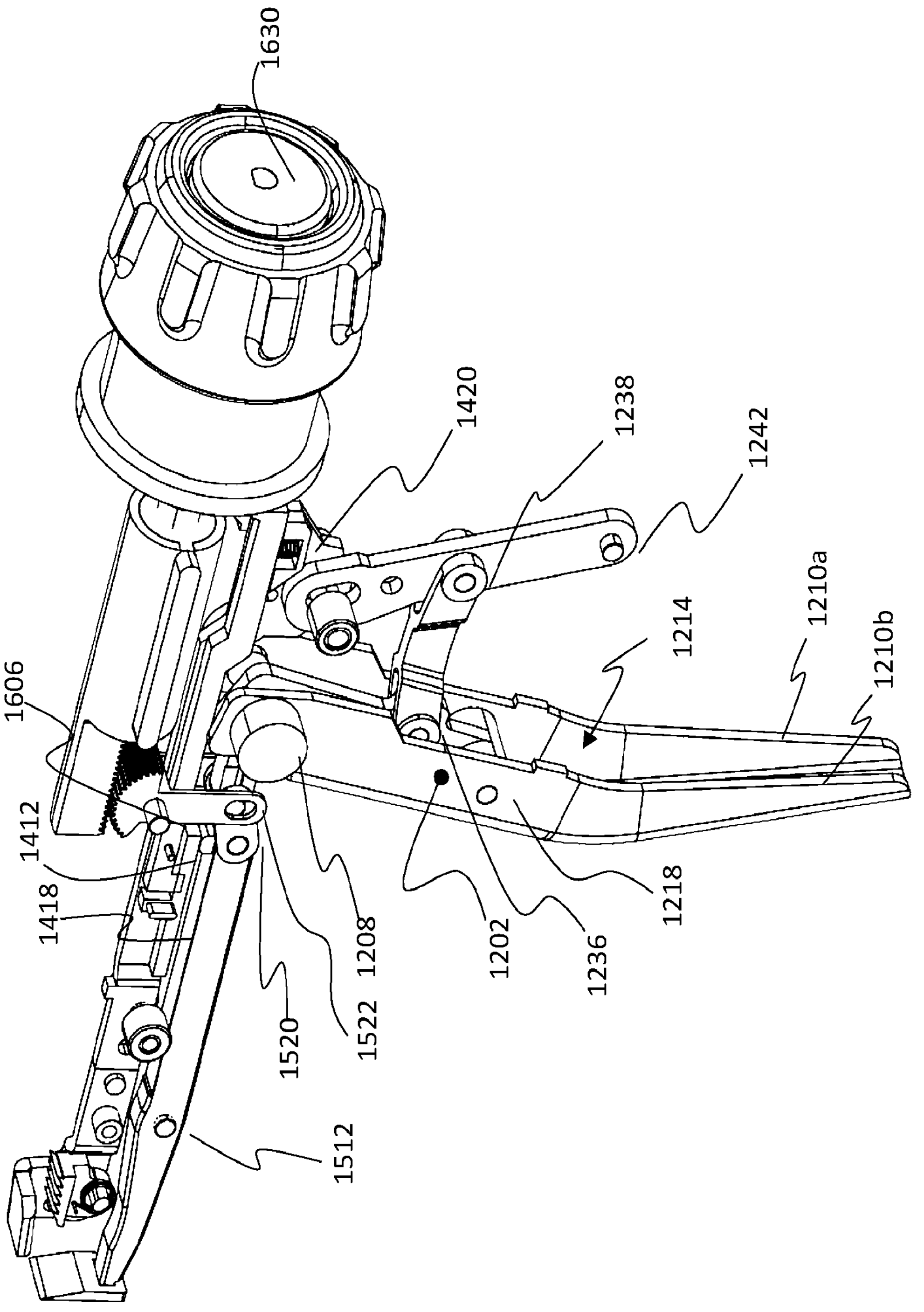
FIG. 21 illustrates a perspective rear view of the alternative embodiment of the assembled cable tie tool of FIG. 20, with the housing removed.

As illustrated in FIG. 20, 21 and in particular 22 and 23, sliding contact member 1416 is provided and slidably mounted within a respective aperture 1324 of the pawl link 1302 and arranged so as to contactingly engage with an upper contact surface of the contact member 1408 of the locking lever 1402. A lower contact surface of the sliding contact member 1416 is contactingly engaged with a protrusion 1508 of the cutting lever 1502.

Further, instead of the fulcrumed lever link, a rack and pinion mechanism 1602, 1604 is utilised to couple the cut-off mechanism 1500 with the adjustable biasing mechanism 1600.

It will be appreciated by persons skilled in the art that the above embodiment(s) have been described by way of example only and not in any limitative sense, and that various alterations and modifications are possible without departing from the scope of the present disclosure as defined by the appended claims. Various modifications to the detailed designs as described above are possible, for example, variations may exist in shape, size, arrangement (i.e. a single unitary components or two separate components), assembly or the like.

Reference numerals list:

| | | | |
|---|---|---|---|
| 100 | Tool | 236 | pivot axis (short link forward) |
| 102 | housing | 238 | pivot axis (short link rearward) |
| 104 | barrel portion | 240a, b | trigger bearings |
| 106 | distal housing end portion | 242 | pivot axis (handle lever) |
| 108 | proximal housing end portion | 244 | elongate aperture |
| 110 | longitudinal axis | 246 | biasing member (torsion spring) |
| 112 | handle portion | 300 | tension mechanism |
| 114 | front cover portion | 302 | pawl link |
| 116 | first cam guide | 302a, b | pawl links (L, R) |
| 118 | second cam guide | 304a, b | pairs of guide apertures (L, R) |
| 120 | pawl engagement portion | 306 | distal end portion (Pawl link) |
| 122 | third cam guide | 308a, b | pairs of guide members |
| 200 | trigger mechanism | 310 | gripping pawl |
| 202 | elongate trigger lever | 311 | pivotable gripping pawl |
| 204 | inner trigger link | 314 | backing plate |
| 206 | trigger housing portion | 316a, b | coil spring |

-continued

| Reference numerals list: | | | |
|---|---|---|---|
| 208 | pivot axis (lever) | 317 | torsion spring |
| 210a | lever side face (L) | 318a, b | link bearings |
| 210b | lever side face (R) | 320 | proximal end portion |
| 212 | lever front face | 322 | bearing pin |
| 214 | lever recess | 326 | protrusion (gripping pawl) |
| 216 | lower link end | 400 | locking mechanism |
| 218 | pivot axis (inner link) | 402 | locking lever |
| 220 | upper link end | 404 | stop member |
| 222 | elongate aperture (oval) | 406 | proximal lever end |
| 224 | handle lever | 408 | contact surface |
| 226 | lower lever end | 410 | distal lever end |
| 227 | proximal (upper) end (trigger level) | 412 | first fulcrum pin |
| 228 | upper lever end | 414 | rack member |
| 230 | short link | 418 | lever support member |
| 232 | forward end | 420 | first biasing member (coil spring) |
| 234 | rearward end | 422 | Support surface |
| 424 | triangular teeth(rack) | 616 | Distal end portion (spring housing) |
| 426 | triangular teeth (stop member) | 618 | proximal end portion (spring housing) |
| 428 | vertical front surface (rack) | 620a, b | lateral protrusions |
| 430 | vertical front surface (stop member) | 622a, b | guide grooves |
| 432 | inclined back surface (rack) | 624 | lead screw mechanism |
| 434 | inclined back surface (stop member) | 626 | proximal end portion |
| 500 | cut-off mechanism | 628 | distal end portion |
| 502 | cutting lever | 630 | adjustment knob |
| 504 | blade member | 632 | thrust bearing |
| 506 | distal cutting lever end | 1000 | alternative tool mechanism |
| 508 | protrusion | 1416 | Sliding member |
| 510 | proximal cutting lever end | 1604 | pinion (rack & pinion) |
| 512 | second fulcrum pin | 1324 | Sliding aperture |
| 514 | cutting linkage | 1408 | Contact member |
| 516a, b | pivot link | 1630 | adjustment knob |
| 518 | sliding link | 1634 | gear mechanism |
| 520 | pivot pin (pivot link)/axis | | |
| 522 | pivot pin (sliding link)/axis | | |
| 524 | cam follower | | |
| 526 | blade guard | | |
| 528a, b | tension spring | | |
| 530 | front wall (blade guard) | | |
| 532 | outer front surface (blade guard) | | |
| 534 | inner front surface (blade guard) | | |
| 536 | aperture (blade guard) | | |
| 600 | adjustable biasing mechanism | | |
| 602 | fulcrumed lever link | | |
| 604 | coupling member | | |
| 605 | grooves | | |
| 606 | third fulcrum pin | | |
| 608 | second biasing member (coil spring) | | |
| 610 | spring housing | | |
| 614 | plunger member | | |

The invention claimed is:

1. A tool for tensioning and severing an elongate cable tie having a tie head portion and a tie tail portion, said tool comprising:

a pistol-shaped housing having a barrel portion extending between a distal housing end portion and a proximal housing end portion along a longitudinal axis, and a handle portion extending away from said barrel portion in a direction different to said longitudinal axis;

a trigger mechanism including an elongate trigger member extending away from said barrel portion operably forward of the handle portion and configured to move toward and away from the handle portion;

a tension mechanism comprising a pawl link provided slidably reciprocatingly within the barrel portion along the longitudinal axis and operably coupled to the trigger mechanism, configured to grippingly engage the cable tie and apply tension to the tie tail when moving said elongate trigger member toward said handle portion during use;

a locking mechanism within the barrel portion and operably coupled with the tension mechanism, configured to stop operation of and lock the tension mechanism at a predetermined tension of the tie tail portion;

a cut-off mechanism within the barrel portion and operably coupled with the trigger mechanism and the locking mechanism, configured to cut the tie tail portion when the locking mechanism is lockingly actuated, and wherein said pawl link comprises at least one guide aperture at a distal end portion configured to slidably receive and retain a corresponding guide member of a gripping pawl so as to allow sliding movement of the gripping pawl relative to the pawl link between a first position and a second position, towards the tie tail portion, during use, in a direction intersecting the longitudinal axis, and wherein the gripping pawl is resiliently biased towards the second position.

2. The tool of claim 1, wherein the second position is distal to the first position.

3. The tool of claim 1, wherein the pawl link comprises two substantially matching parallelly arranged arms extending along said longitudinal axis, each one provided with a respective one of the at least one guide aperture at said distal end portion, configured to operably receive and slidingly retain the gripping pawl, therebetween.

4. The tool of claim 3, wherein two guide apertures are at the distal end portion of each one of the two substantially matching parallelly arranged arms.

5. The tool of claim 1, wherein the pawl link includes a backing plate at the distal end portion configured to cooperate with the gripping pawl, so as to operably engage the cable tie, during use.

6. The tool of claim 5, wherein the backing plate is on an upper surface of the pawl link facing in a direction opposite the handle portion.

7. The tool of claim 5, wherein the second position is towards the backing plate.

8. The tool of claim 5, wherein the at least one guide aperture defines a predetermined cam profile for the guide member configured to maximize contact engagement between the gripping pawl, the tie tail portion, and the backing plate, during use.

9. The tool of claim 1, wherein the gripping pawl is resiliently biased towards the second position via a spring element operably coupled between the gripping pawl and the pawl link.

10. The tool of claim 1, wherein the at least one guide member extends from a side portion of the gripping pawl in a direction perpendicular to the longitudinal axis.

11. The tool of claim 1, wherein the gripping pawl is configured to engage with an engagement portion of the distal housing end portion so as to push the gripping pawl towards the first position by a predetermined distance when the pawl link is in a starting position.

* * * * *